(12) United States Patent
Kim et al.

(10) Patent No.: US 10,652,375 B2
(45) Date of Patent: May 12, 2020

(54) ELECTRONIC DEVICE AND STRUCTURE OF HOUSING FOR SAME

(71) Applicant: Samsung Electronics Co., Ltd., Suwon-si, Gyeonggi-do (KR)

(72) Inventors: Hyunjin Kim, Suwon-si (KR); Seungtae Ko, Suwon-si (KR); Junsig Kum, Suwon-si (KR); Yoongeon Kim, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/265,014

(22) Filed: Feb. 1, 2019

(65) Prior Publication Data

US 2019/0245953 A1 Aug. 8, 2019

(30) Foreign Application Priority Data

Feb. 6, 2018 (KR) ........................ 10-2018-0014463

(51) Int. Cl.
*H04B 1/00* (2006.01)
*H04M 1/02* (2006.01)
*H01Q 1/24* (2006.01)

(52) U.S. Cl.
CPC ......... *H04M 1/026* (2013.01); *H04M 1/0202* (2013.01); *H01Q 1/245* (2013.01)

(58) Field of Classification Search
CPC ...... H04M 1/026; H04M 1/0249; H04M 1/02; H04M 1/03; H04B 1/03; H01Q 1/245
See application file for complete search history.

(56) References Cited

U.S. PATENT DOCUMENTS

| | | | | |
|---|---|---|---|---|
| 9,698,847 | B2 * | 7/2017 | Nghiem | H04B 1/3838 |
| 2003/0048225 | A1 * | 3/2003 | Yoon | H01Q 1/38 |
| | | | | 343/700 MS |
| 2005/0057402 | A1 * | 3/2005 | Ohno | H01Q 9/0485 |
| | | | | 343/700 MS |
| 2007/0296638 | A1 | 12/2007 | Kim et al. | |
| 2010/0164809 | A1 * | 7/2010 | Cheng | H01Q 9/0414 |
| | | | | 343/700 MS |
| 2010/0331050 | A1 | 12/2010 | Tahk et al. | |
| 2011/0115679 | A1 * | 5/2011 | Kong | H01Q 1/243 |
| | | | | 343/702 |
| 2012/0133562 | A1 | 5/2012 | Kim et al. | |
| 2015/0188215 | A1 | 7/2015 | Jarvis | |
| 2017/0117929 | A1 | 4/2017 | Nghiem et al. | |
| 2017/0201014 | A1 | 7/2017 | Lee et al. | |
| 2017/0214120 | A1 | 7/2017 | Lee et al. | |
| 2018/0131090 | A1 * | 5/2018 | Ohno | G01S 13/04 |

OTHER PUBLICATIONS

International Search Report dated May 1, 2019, issued in International Patent Application No. PCT/KR2019/001429.

* cited by examiner

*Primary Examiner* — Andrew Wendell
(74) *Attorney, Agent, or Firm* — Jefferson IP Law, LLP

(57) ABSTRACT

The disclosure relates to a 5G or pre-5G communication system for supporting higher data transmission rates than 4G communication systems such as LTE systems. The disclosure relates to the structure of a housing with a dielectric. A housing of a terminal device using an antenna is provided. The at least one protrusion formed of a dielectric in the housing is configured to be positioned between a side surface of the housing and the antenna.

15 Claims, 23 Drawing Sheets

ELECTRONIC DEVICE AND STRUCTURE OF HOUSING FOR SAME

CROSS-REFERENCE TO RELATED APPLICATION(S)

This application is based on and claims priority under 35 U.S.C. § 119(a) of a Korean patent application number 10-2018-0014463, filed on Feb. 6, 2018, in the Korean Intellectual Property Office, the disclosure of which is incorporated by reference herein in its entirety.

BACKGROUND

1. Field

The disclosure relates to an electronic device and the structure of a housing for the electronic device.

1. Description of Related Art

Electronic devices may output stored information as sounds or images. As electronic devices have become highly integrated, and high-speed, high-volume wireless communication becomes commonplace, electronic devices, such as mobile communication terminals, are recently being equipped with various functions. For example, electronic devices come with the integrated functionality, including entertainment functions, such as playing video games, multimedia functions, such as replaying music/videos, communication and security functions for mobile banking, and scheduling or e-wallet functions.

In order to meet the demand for soaring wireless data traffic since 4G communication systems came to the market, there have been ongoing efforts to develop next-generation communication systems, e.g., 5G communication systems or pre-5G communication systems.

For higher data rates, next-generation communication systems adopt ultra-high frequency bands of a few tens of GHz, e.g., 6 GHz or more and 300 GHz or less, such as those of mm Wave. To mitigate path loss on the ultra-high frequency band and increase the reach of radio waves, the following techniques are taken into account for next-generation communication systems: beamforming, massive multi-input multi-output (MIMO), full dimensional MIMO (FD-MIMO), array antenna, analog beamforming, and large scale antenna.

The use of next-generation communications leads to the tendency for electronic devices to employ higher frequencies, such as ultra-high frequency bands, thus resulting in several issues. Techniques to address such issues are being developed.

The above information is presented as background information only to assist with an understanding of the disclosure. No determination has been made, and no assertion is made, as to whether any of the above might be applicable as prior art with regard to the disclosure.

SUMMARY

According to an embodiment of the disclosure, a housing of a terminal device using an antenna is provided. The housing includes at least one protrusion including a dielectric. The at least one protrusion is configured to be positioned between a side surface of the housing and the antenna.

At least one side surface of each of the at least one protrusion facing the antenna may be formed to have an angle within a first range with respect to a bottom part of the housing. As per the angle within the first range, a signal transmitted from the antenna may be incident to the at least one side surface at an angle within a second range.

The first range may be from 60° to 90°, and the second range may be from 0° to 30°.

At least one of the length of the at least one protrusion, the interval between the at least one protrusion, and the distance between the at least one protrusion and the antenna may be related to the wavelength of a signal emitted from the antenna.

The length of the at least one protrusion or the interval between the at least one protrusion may be a value obtained by dividing the wavelength of the signal emitted from the antenna by a multiple of 2.

The distance between the at least one protrusion and the antenna may be smaller than a value obtained by dividing the wavelength of the signal emitted from the antenna by 4.

The at least one dielectric may be spaced apart from each other at the same interval and be positioned on the side surface of the housing.

The at least one protrusion may be formed to be perpendicular to a bottom part of the housing.

The at least one protrusion may be formed to be parallel to a bottom part of the housing.

The at least one protrusion may be positioned in at least one of corners of the housing.

The dielectric may include at least one first protrusion and at least one second protrusion. The direction in which the at least one first protrusion is arranged may be perpendicular to the direction in which the at least one second protrusion is arranged.

The antenna may be positioned inside the housing.

According to an embodiment of the disclosure, a terminal device using an antenna is provided. The terminal device includes a housing and at least one protrusion including a dielectric. The at least one protrusion may be configured to be positioned between a side surface of the housing and the antenna.

At least one side surface of each of the at least one protrusion facing the antenna may be formed to have an angle within a first range with respect to a bottom part of the housing. As per the angle within the first range, a signal transmitted from the antenna may be incident to the at least one side surface at an angle within a second range.

The first range may be from 60° to 90°, and the second range may be from 0° to 30°.

At least one of the length of the at least one protrusion, the interval between the at least one protrusion, and the distance between the at least one protrusion and the antenna may be related to the wavelength of a signal emitted from the antenna.

The length of the at least one protrusion or the interval between the at least one protrusion may be a value obtained by dividing the wavelength of the signal emitted from the antenna by a multiple of 2.

The distance between the at least one protrusion and the antenna may be smaller than a value obtained by dividing the wavelength of the signal emitted from the antenna by 4.

The at least one dielectric may be spaced apart from each other at the same interval and be positioned on the side surface of the housing.

The at least one protrusion may be formed to be perpendicular to a bottom part of the housing.

The at least one protrusion may be formed to be parallel to a bottom part of the housing.

The at least one protrusion may be positioned in at least one of corners of the housing.

The dielectric may include at least one first protrusion and at least one second protrusion. The direction in which the at least one first protrusion is arranged may be perpendicular to the direction in which the at least one second protrusion is arranged.

The antenna may be positioned inside the housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, wherein.

Throughout the drawings, like reference numerals will be understood to refer to like parts, components, and structures.

DETAILED DESCRIPTION

Figure 1:
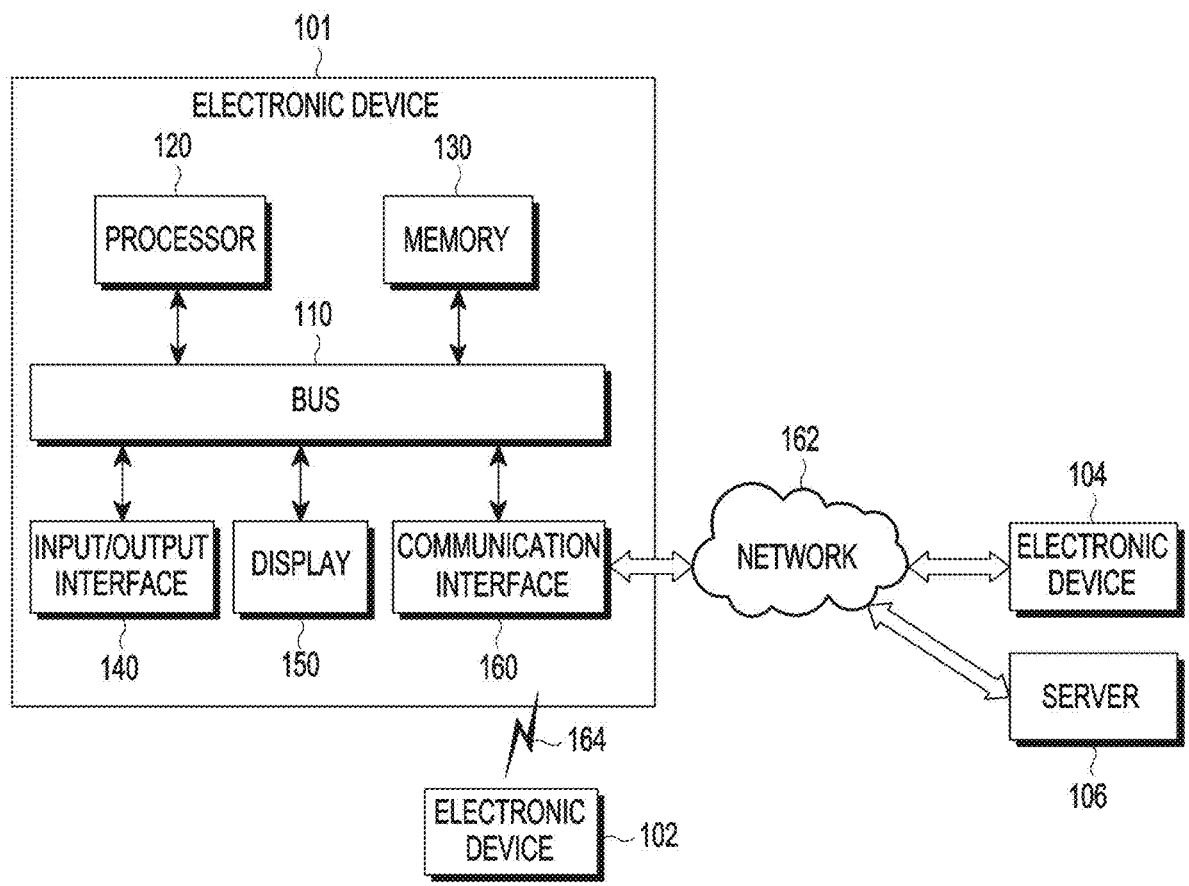
FIG. 1 is a view illustrating a network environment including an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "first" and "second" as used herein may be used to describe various components, but the components should not be limited by the terms. The terms are used only to distinguish one component from another. It is to be understood that the singular forms "a," "an," and "the" include plural references unless the context clearly dictates otherwise. When an element "includes" another element, the element may further include the other element, rather excluding the other element, unless particularly stated otherwise.

A function provided in an element or a 'unit' may be combined with additional elements or may be split into sub elements or sub units.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

An aspect of the disclosure is to provide an apparatus and method to address issues that arise in a housing structure for electronic devices that are used in next-generation communications (e.g., 5G communications or mm Wave communications).

Additional aspects will be set forth in part in the description which follows and, in part, will be apparent from the description, or may be learned by practice of the disclosure.

According to an embodiment of the disclosure, a housing structure for electronic devices used in next-generation communications may mitigate influence by a constituent member (e.g., a housing) of an electronic device due to high-frequency characteristics.

According to an embodiment of the disclosure, a scheme for preventing deterioration of antenna performance by a constituent member of an electronic device is provided.

According to various embodiments, there is provided a method for providing a high antenna gain and wider antenna phase coverage.

According to various embodiments, a dielectric with at least one dielectric protrusion may be placed, attached, or seated on a side surface of a housing, thus enhancing antenna performance (e.g., antenna gain or phase coverage).

According to various embodiments, a wave guide effect may be obtained. The term "wave guide effect" may refer to the effect of increasing the antenna gain in a desired direction.

FIG. 1 is a view illustrating a network environment including an electronic device according to an embodiment of the disclosure.

Referring to FIG. 1, according to an embodiment of the disclosure, an electronic device 101 is included in a network environment. The electronic device 101 may include a bus 110, a processor 120, a memory 130, an input/output interface 140, a display 150, and a communication interface 160. In some embodiments, the electronic device 101 may exclude at least one of the components or may add another component.

The bus 110 may include a circuit, e.g., for connecting the processor 120, the memory 130, the input/output interface 140, the display 150, and the communication interface 160 with one another and transferring communications (e.g., control messages and/or data) between the processor 120, the memory 130, the input/output interface 140, the display 150, and the communication interface 160.

The processor 120 may include one or more of a central processing unit (CPU), an application processor (AP), or a communication processor (CP). The processor 120 may perform control on at least one of the other components of the electronic device 101 or perform an operation or data processing relating to communication.

The memory 130 may include a volatile and/or non-volatile memory. For example, the memory 130 may store commands or data related to at least one other component of, e.g., the electronic device 101.

The input/output interface 140 may serve as an interface that may, e.g., transfer commands or data input from a user or other external devices to other component(s) of the electronic device 101. Further, the input/output interface 140 may output commands or data received from other component(s) of the electronic device 101 to the user or the other external device.

The display 150 may include, e.g., a liquid crystal display (LCD), a light emitting diode (LED) display, an organic light emitting diode (OLED) display, or a microelectromechanical systems (MEMS) display, or an electronic paper display. The display 150 may display, e.g., various contents (e.g., text, images, videos, icons, or symbols) to the user. The display 150 may include a touchscreen and may receive, e.g., a touch, gesture, proximity or hovering input using an electronic pen or a body portion of the user.

For example, the communication interface 160 may set up communication between the electronic device 101 and an external electronic device (e.g., a first external electronic device 102, a second external electronic device 104, or a server 106). For example, the communication interface 160 may be connected with a network 162 through wireless or wired communication to communicate with the external electronic device (e.g., the second external electronic device 104 or the server 106).

The wireless communication may use at least one of, e.g., 5G-standard next-generation communications, long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM), as a cellular communication protocol. Further, the wireless communication may include, e.g., a short-range communication 164. The short-range communication 164 may include at least one of, e.g., wireless fidelity (Wi-Fi), Bluetooth, near-field communication (NFC), or global navigation satellite system (GNSS).

The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of communication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the disclosure, the server 106 may include a group of one or more servers. According to an embodiment of the disclosure, all or some of operations executed on the electronic device 101 may be executed on another or multiple other electronic devices (e.g., the first and second external electronic devices 102 and 104 or the server 106). According to an embodiment of the disclosure, when the electronic device 101 should perform some function or service automatically or at a request, the electronic device 101, instead of executing the function or service on its own or additionally, may request another device (e.g., one of the first and second external electronic devices 102 and 104 or the server 106) to perform at least some functions associated therewith. The other electronic device (e.g., one of the first and second external electronic devices 102 and 104 or the server 106) may execute the requested functions or additional functions and transfer the result of the execution to the electronic device 101. The electronic device 101 may provide a requested function or service by processing the received result as it is or additionally. To that end, a cloud computing, distributed computing, or client-server computing technique may be used, for example.

Figure 2:
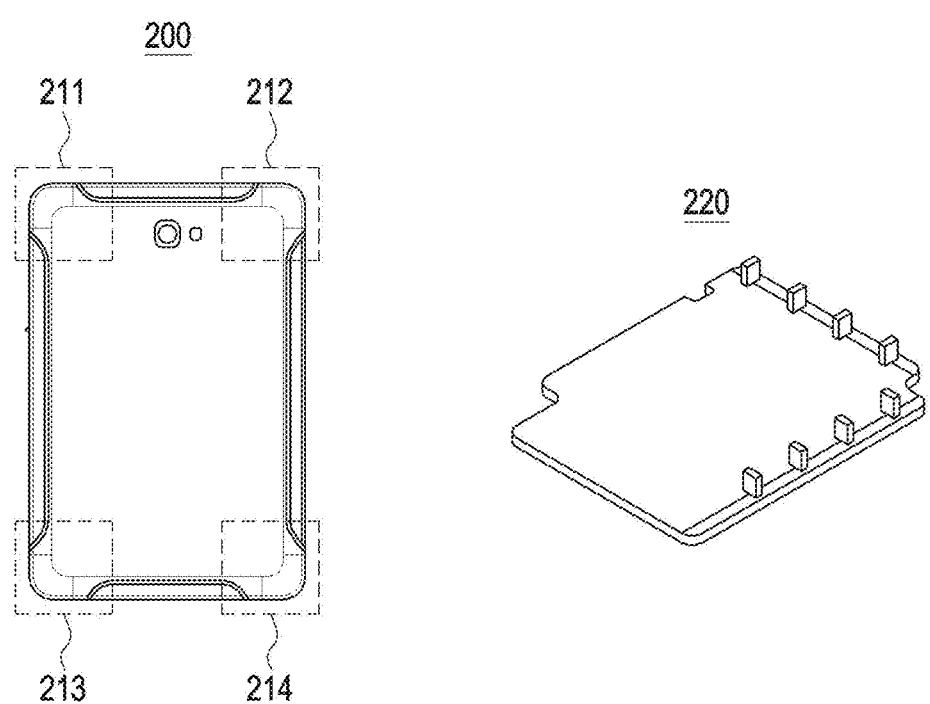
FIG. 2 is a view illustrating an example of a housing and communication antenna of an electronic device according to an embodiment of the disclosure.

FIG. 2 is a view illustrating an example of a housing and a communication antenna of an electronic device according to an embodiment of the disclosure.

Referring to FIGS. 1 and 2, an electronic device may be a user equipment, terminal, and/or vehicle-to-everything (V2X) device including a housing 200 according to various embodiments of the disclosure.

The term "housing" may be interchangeably used with the term "member," "cover," "external frame," or "shell" as for receiving internal elements of the electronic device 101. The housing 200 may refer to a frame forming the outer look of the electronic device 101. Meanwhile, the housing 200 may be formed of plastic, a metal, an alloy, or a combination of at least one thereof. However, the substance forming the housing 200 is not limited thereto.

The electronic device 101 may include a communication antenna 220 to communicate with the first and second external electronic devices 102 and 104 or the server 106. As an example, the communication antenna 220 may be positioned in each corner 211, 212, 213, and 214 of the electronic device 101. For example, the communication antenna 220 may be a broadside antenna and/or an end-fire antenna used for 5G communications. Here, the broadside antenna may mean an antenna with an antenna pattern in which the maximum value of the lobe is perpendicular to the flat surface containing the antenna, and the end-fire antenna may mean an antenna with an antenna pattern in which the maximum value of the lobe is on the flat surface containing the antenna. Meanwhile, the end-fire antenna may be a horizontal-polarization end-fire antenna to emit signals in the horizontal direction of the electronic device 101.

As a signal emitted from the communication interface 160 of the electronic device 101 hits a side surface of the housing 200, the signal may be lost. For example, as the signal emitted from the communication interface 160 of the electronic device 101 hits the side surface of the housing formed of a dielectric material and with curvature, only part of the signal passes through the side surface of the housing while the rest may be reflected, refracted, or absorbed by the housing. Thus, the pattern of the signal emitted from the communication interface 160 of the electronic device 101 may be broken.

Figure 3:
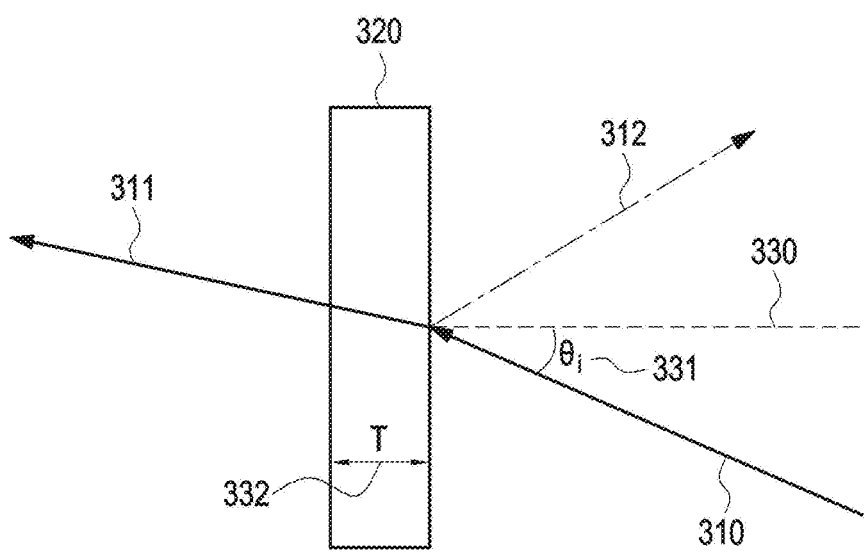
FIG. 3 is a view illustrating an example in which an incidence wave is transmitted through or reflected by a side surface of a housing according to an embodiment of the disclosure.

FIG. 3 is a view illustrating an example in which an incidence wave is transmitted through or reflected by a side surface of a housing according to an embodiment of the disclosure.

Referring to FIG. 3, an example is described in which an incidence wave 310 hits a side surface 320 of a housing according to an embodiment of the disclosure. The incidence wave 310 may be a signal emitted from the communication interface 160 of FIG. 1. As an example, the incidence wave 310 may be an mm Wave signal, and as another example, the incidence wave 310 may be a signal with a wavelength of about 10.7 mm corresponding to about 28-GHz signal used for 5G communications.

An incident angle $\theta_i$ 331, which indicates an angle at which the incidence wave 310 is incident to the side surface 320 of the housing, may indicate the degree between a virtual reference line 330 perpendicular to the side surface 320 of the housing and the incidence wave 310.

Referring to FIG. 3, only part of the incidence wave 310, as a transmitted wave 311, may pass through the side surface 320 of the housing while the rest, as a reflected wave 312, are reflected by the side surface 320 of the housing. Here, the proportion of the transmitted wave 311 and the proportion of the reflected wave 312 may be determined by a thickness T 332 of the side surface 320 of the housing and/or the incident angle $\theta_i$ 331 of the incidence wave 310 according to an embodiment of the disclosure.

For example, the proportion of the transmitted wave 311 and the proportion of the reflected wave 312 may be determined by the reflection coefficient $\Gamma_1$ of the side surface 320 of the housing. The reflection coefficient $\Gamma_1$ may be obtained using Equations 1 and 2 below.

$$\Gamma_1 = \frac{\rho_1 + \Gamma_1'}{1 + \rho_1 \Gamma_1'} = \frac{\rho_1 + \Gamma_2 e^{-2jk_1 l_1}}{1 + \rho_1 \Gamma_2 e^{-2jk_1 l_1}} = \frac{\rho_1 + \rho_2 e^{-2jk_1 l_1}}{1 + \rho_1 \rho_2 e^{-2jk_1 l_1}} \quad \text{Equation 1}$$

$$l_1 = T \csc\theta \quad \text{Equation 2}$$

In Equations 1 and 2 above, $\Gamma_1$ denotes the reflection coefficient, $\rho_1$ denotes the elementary reflection coefficient of the side surface 320 of the housing, $\rho_2$ denotes the elementary reflection coefficient of air, $k_I$ denotes the propagation wavenumber (1/wavelength ($\lambda$)), and T denotes the thickness of the side surface of the housing.

As an example, when the incidence wave 310 is incident to the side surface 320 of the housing at 45°, only about 40% of it, which is slightly less than the half, is transmitted as the transmitted wave 311, and about 60% of it, which is more than the half, may be reflected as the reflected wave 312.

Figure 4:
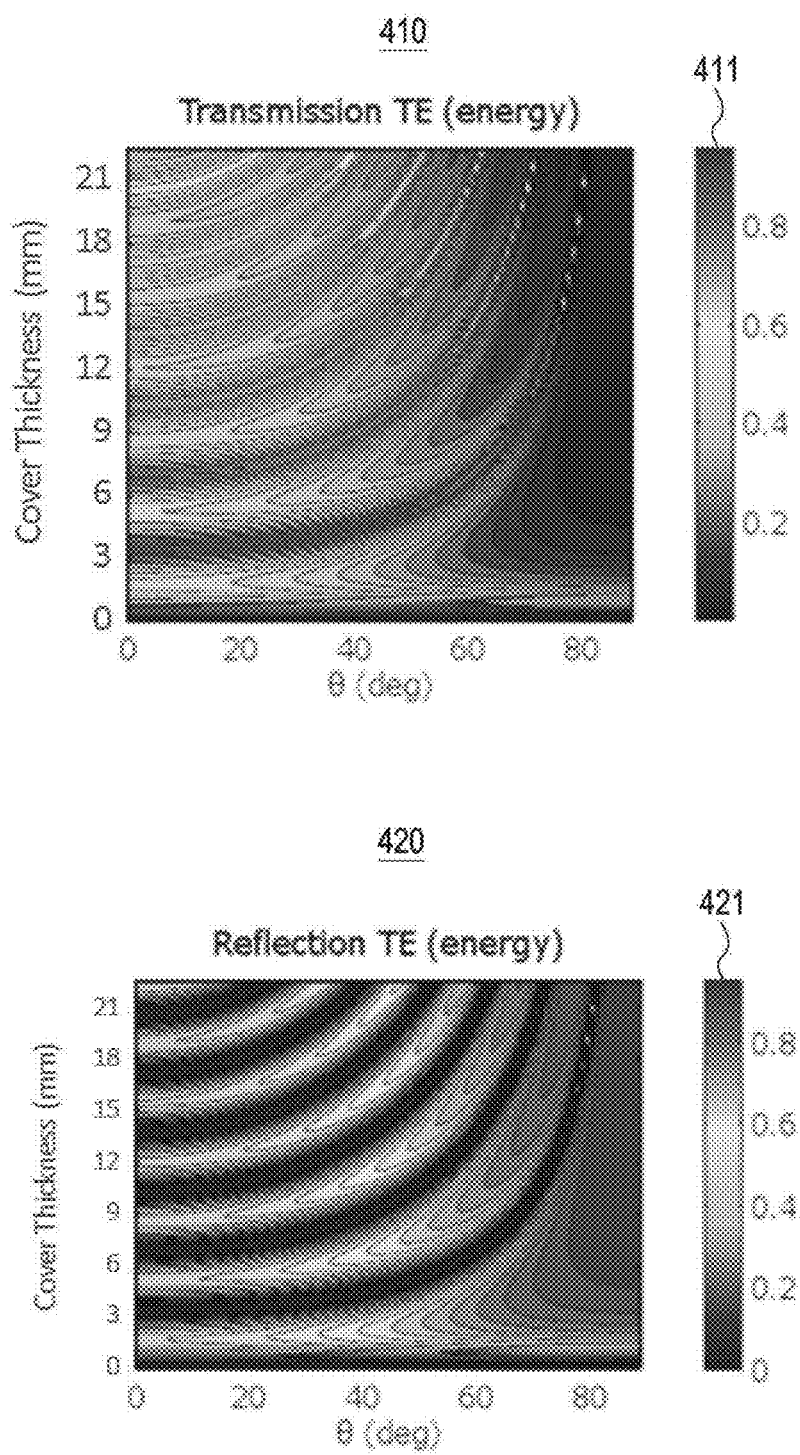
FIG. 4 is a view illustrating an example of a graph indicating a transmission coefficient/reflection coefficient as an incident angle and a thickness of a side wall of a housing vary according to an embodiment of the disclosure.

FIG. 4 is a view illustrating an example of a graph indicating the transmission coefficient/reflection coefficient as an incident angle and a thickness of a side wall of a housing vary according to an embodiment of the disclosure.

A first graph 410 of FIG. 4 indicates the relationship between the incident angle $\theta_i$, the thickness T of the side surface of the housing, and the transmission coefficient according to an embodiment of the disclosure. In the first graph 410, the X axis denotes the incident angle $\theta_i$ [degrees], and the Y axis denotes the thickness (cover thickness [mm]) of the side surface of the housing. In the first graph 410, a bar 411 denotes the transmission coefficient (0.0 to 1.0) in shading. Referring to the first graph 410, assuming that the side surface of the housing remains even in thickness (or that the same side surface of the housing is used), the transmission coefficient may decrease as the incident angle increases.

A second graph 420 of FIG. 4 indicates the relationship between the incident angle $\theta_i$, the thickness T of the side surface of the housing, and the reflection coefficient according to an embodiment of the disclosure. In the second graph 420, the X axis denotes the incident angle $\theta_i$ [degrees], and the Y axis denotes the thickness (cover thickness [mm]) of the side surface of the housing. In the second graph 420, a bar 421 denotes the reflection coefficient (0.0 to 1.0) in shading. Referring to the second graph 420, assuming that the side surface of the housing remains even in thickness (or that the same side surface of the housing is used), the reflection coefficient may increase as the incident angle increases.

In other words, when the side surface of the housing remains even in thickness T, a smaller incident angle $\theta_i$ may provide better efficiency in light of transmission coefficient.

Figure 5A:
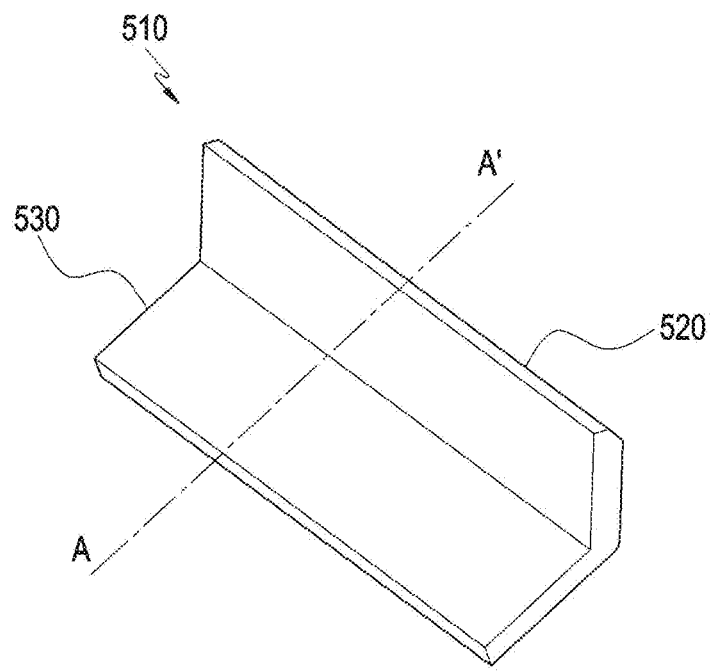
FIGS. 5A and 5B are views illustrating an example of a side wall of a housing according to various embodiments of the disclosure.
Figure 5B:
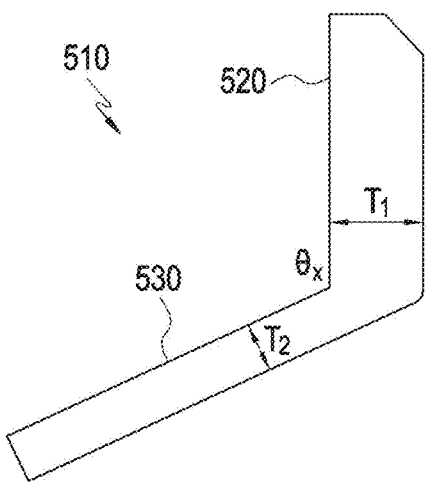

FIGS. 5A and 5B are views illustrating an example of a side wall of a housing according to various embodiments of the disclosure.

FIG. 5A is a perspective view illustrating a side surface 510 of a housing according to an embodiment of the disclosure. FIG. 5A illustrates only a portion of the side surface 510 of the housing for ease of description, and the outer look of the side surface 510 of the housing is not limited thereto or thereby according to an embodiment of the disclosure. Thus, the size, length, angle, thickness, or other appearance factors of the side surface 510 of the housing may be slightly different from those shown in FIG. 5A according to an embodiment of the disclosure.

Referring to FIG. 5A, the side surface 510 of the housing may include a first region 520 and a second region 530 according to an embodiment of the disclosure. The side surface 510 of the housing may be an outermost member of the housing or one corresponding to a side surface among external frames of the electronic device.

The first region 520 may be a member corresponding to a side or lateral surface of the housing, and the second region 530 may be a member coupled with the first region 520 in order to back up the first region 520. For example, the first region 520 may have a thickness of $T_1$, and the second region 530 may have a thickness of $T_2$. The first region 520 and the second region 530 may be joined together by physical and/or chemical bonding.

FIG. 5B is a cross-sectional view taken by cutting the side surface 510 of the housing along dash-dotted line A-A' of FIG. 5A according to an embodiment of the disclosure.

Referring to FIG. 5B, a degree $\theta_x$ between the first region 520 and the second region 530 may be an obtuse angle (from 90° to 180°) as shown in FIG. 5B according to an embodiment of the disclosure.

Variations in antenna gain by the thickness $T_1$ of the first region 520 and/or the thickness $T_2$ of the second region 530 are described below with reference to FIGS. 6A and 6B according to an embodiment of the disclosure.

Figure 6A:
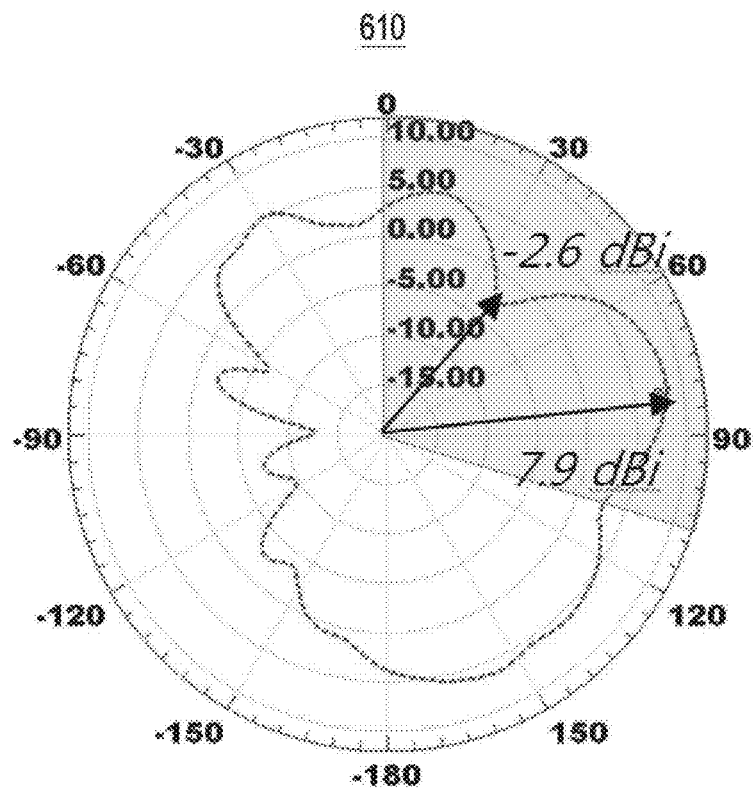
FIGS. 6A and 6B are views illustrating an example of an antenna directivity diagram related to a thickness of a side wall of a housing according to various embodiments of the disclosure.
Figure 6B:
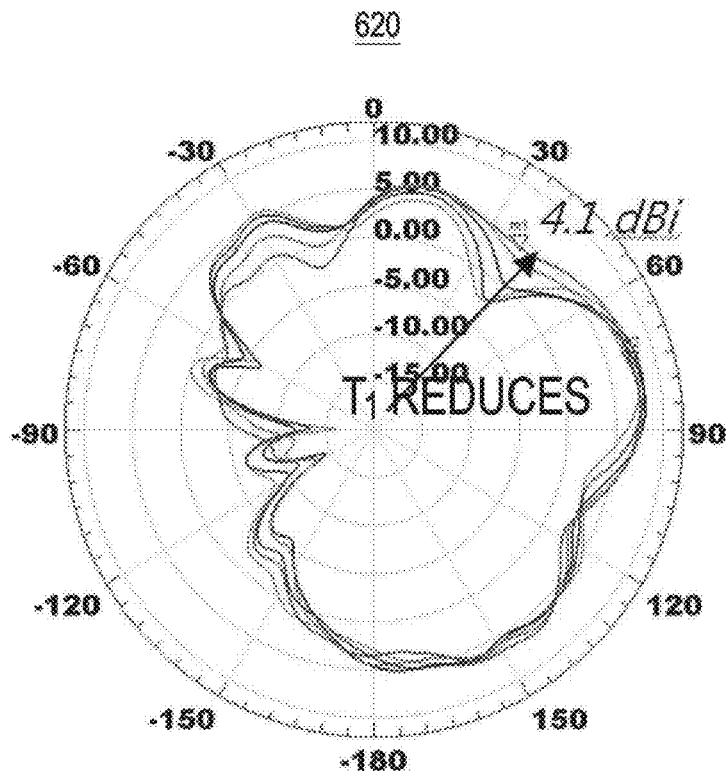

FIGS. 6A and 6B are views illustrating an example of an antenna directivity diagram related to a thickness of a side wall of a housing according to an embodiment of the disclosure.

Referring to FIG. 6A, the first diagram may be an antenna directivity diagram obtained by measuring a signal emitted from a communication module (or the communication interface 160) included in the housing (including the side surface 510 of the housing described above in connection with FIG. 5) according to an embodiment of the disclosure. The emitted signal may be transmitted (or pass) through the side surface 510 of the housing to the outside of the housing. A first diagram 610 may be one obtained by measuring the signal at the outside of the housing. As an example, the first diagram 610 may be an antenna directivity diagram in which the thickness $T_1$ of the first region is 2.4 mm, and the thickness $T_2$ of the second region 530 is 1.4 mm.

Referring to FIG. 6B, a second diagram 620 exhibits the tendency of the antenna gain increasing as the thickness $T_1$ of the first region 520 decreases.

As an example, when in the second diagram 620 the thickness $T_1$ of the first region is 2.4 mm, and the thickness $T_2$ of the second region 530 is 1.4 mm, the antenna gain increases from (−)2.6 dBi to (+)4.1 dBi as the thickness of the first region 520 gradually decreases. In other words, the second diagram 620 exhibits the tendency of the antenna gain increasing as the thickness $T_1$ of the first region 520 decreases.

However, a limit is imposed on decreasing the thickness of the housing of the electronic device to obtain a higher antenna gain. Given this, described below is a method for enhancing antenna gain using various examples of dielectrics positioned, seated, or attached to the side surface of the housing.

FIGS. 7A, 7B, 7C, and 7D are views illustrating a dielectric according to various embodiments of the disclosure.

Figure 7A:
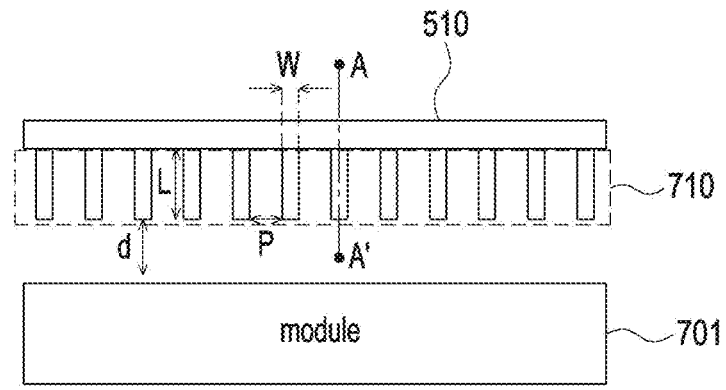
FIGS. 7A, 7B, 7C, and 7D are views illustrating a dielectric according to various embodiments of the disclosure.

FIG. 7A is a cross-sectional view of a configuration including a side surface of a housing, a dielectric, and a communication module according to an embodiment of the disclosure.

Referring to FIG. 7A, a dielectric 710 may include at least one protrusion. The at least one protrusion may be formed of a dielectric 710. The at least one protrusion may be formed of a material that reacts to an external electric field to create an electric dipole. For example, the at least one protrusion may be formed of polycarbonate (PC), polyethylene (PE), Teflon, ceramics, or barium strontium titanate ($Ba_x$ $Si_{1-x}TiO_3$). However, the material forming the at least one protrusion is not limited thereto. The term "protrusion" may be interchangeably used with the term "antenna assistant means" or "signal control means."

The dielectric 710 may be formed at the position where an incidence wave (incidence wave 703 of FIG. 7B) emitted from the communication module 701 reaches the dielectric 710 before reaching the side surface 510 of the housing according to an embodiment of the disclosure. For example, the dielectric 710 may be positioned between the communication module 701 emitting the incidence wave 703 and the side surface 510 of the housing. As an example, the communication module 701 may be the communication interface 160 of FIG. 1 according to an embodiment of the disclosure. As another example, the communication module 701 may include, e.g., a cellular Wi-Fi module, a Bluetooth (BT) module, a GNSS module (e.g., a GPS module, a Glonass module, a Beidou module, or a Galileo module), an NFC module, and an RF module.

Figure 7B:
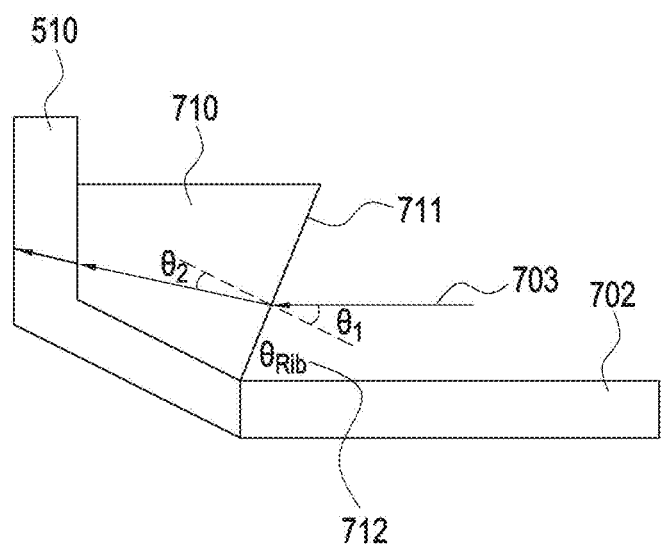

FIG. 7B is a cross-sectional view obtained by cutting the side surface 510 of the housing and the dielectric 710 along dash-dotted line A-A' of FIG. 7A according to an embodiment of the disclosure. In FIG. 7B, the dielectric 710 may be any one of at least one protrusion according to an embodiment of the disclosure.

For example, in order for the dielectric 710 to be positioned, seated, or attached to the side surface 510 of the housing, one side surface of the at least one protrusion may be formed to have a shape corresponding to the side surface 510 of the housing. Here, the one side surface of the at least one protrusion may mean where the dielectric 710 contacts or meets the side surface 510 of the housing. As another example, although not shown in FIG. 7A, the at least one protrusion may add a connector or fastener to connect with the side surface 510 of the housing according to an embodiment of the disclosure. In other words, the at least one protrusion and the side surface 510 of the housing may be joined together by physical and/or chemical bonding.

Referring to FIG. 7B, the part of the dielectric 710 projected towards the communication module 701 is defined as a dielectric inner side 711 according to an embodiment of the disclosure. The dielectric inner side 711 of the dielectric 710 may be formed to be angled at a predetermined angle $\theta_{Rib}$ (hereinafter, referred to as a "protrusion angle ($\theta_{Rib}$) 712") from a bottom part 702 of the housing to allow the incident angle $\theta_i$ (which may be the incident angle $\theta_i$ described above with reference to FIG. 3) of the incidence wave 703 to be a non-zero angle (e.g., preferably 30°, a relevant description is given below in connection with FIG. 7C) according to an embodiment of the disclosure. The term "bottom part" may be interchangeably used with the term "bottom," "bottom plate," "bottom surface," "back plate," or "back surface." The protrusion angle ($\theta_{Rib}$) 712 may be an acute angle (0° to 90°) as shown in FIG. 7B according to an embodiment of the disclosure. As an example, the side surface (e.g., the dielectric inner side 711) of each of the at least one protrusion of the dielectric 710 facing the communication module 701 may be formed to be angled at the protrusion angle ($\theta_{Rib}$) 712 of 60° to 90° from the bottom part 702 of the housing, a signal transmitted from the communication module 701 may be incident to the side surface of each protrusion facing the communication module 701 at an angle of 0° to 30°.

The cross section of the dielectric 710 may be shaped like a quadrangle as shown in FIG. 7B according to an embodiment of the disclosure.

Described below is Equation 3 used to predict a refractive angle $\theta_2$ at which the incidence wave 700 transmitted through the dielectric 710 is refracted.

$$\sin\theta_2 = \frac{n_1}{n_2} \cdot \sin\theta_1 \qquad \text{Equation 3}$$

Referring to Equation 3, the refractive angle ($\theta_2$) at which the incidence wave 700 incident to the dielectric 710 is refracted may be determined by the incident angle ($\theta_1$), the refractive index ($n_1$) of medium 1, and the refractive index ($n_2$) of medium 2. In the example shown in FIGS. 7A to 7D, medium 1 may be air, and medium 2 may be the dielectric 710 according to various embodiments of the disclosure.

Referring to FIGS. 7A and 7B, L, W, P, and d respectively denote the length of the dielectric 710, the thickness of the dielectric 710, the inter-dielectric interval, and the distance between the dielectric 710 and the communication module 701 according to various embodiments of the disclosure. The dielectric 710 may indicate any one of the at least one protrusion.

The inter-dielectric interval P may be proportional to the wavelength of the signal (e.g., an incidence wave) emitted from the communication module 701. For example, the inter-dielectric interval P may be the value obtained by dividing the wavelength of the incidence wave 703 emitted from the communication module 701 by a multiple of 2. For example, the inter-dielectric interval P=$\lambda$/(2m) (m=1, 2, 3 . . . ). The incidence wave 703 emitted from the communication module 701 may correspond to an mm Wave. For example, the incidence wave 703 emitted from the communication module 701 may be a signal of about 28 GHz used for 5G communications, with the result having about 10.7 mm wavelength.

The interval between the at least one dielectric positioned on the side surface 510 of the housing may remain identical. In other words, the at least one dielectric may be spaced apart from each other at the same interval and be positioned on the side surface 510 of the housing.

The distance d between the dielectric 710 and the communication module 701 may be smaller than the value proportional to the wavelength of the incidence wave 703 emitted from the communication module 701. For example, the distance d between the dielectric 710 and the communication module 701 may meet the following equation: d<$\lambda$/4 (namely, it may be smaller than the value obtained by dividing the wavelength by 4). The distance d between the dielectric 710 and the communication module 701 may be determined by the longest one of the at least one dielectric (in the case where the at least one dielectric has different lengths).

The length L of the dielectric 710 may be proportional to the wavelength of the incidence wave 703 emitted from the communication module 701. For example, the length L of the dielectric may be the value obtained by dividing the wavelength of the signal 703 emitted from the communication module 701 by a multiple of 2 (namely, L=$\lambda$/(2m) (m=1, 2, 3 . . . )). As the length L of the dielectric increases, the antenna gain has the tendency of increasing, which is described below in connection with FIG. 10.

The wave guide effect by the dielectric may be enhanced by adjusting the above-mentioned parameters L, W, d, or P. The phase coverage of the antenna may be enhanced by adjusting the length of the dielectric 710 and the protrusion angle ($\theta_{Rib}$).

It can be shown from FIG. 7B that a signal travels along a similar direction to the direction in which the incidence wave 703 is incident to the dielectric (or the direction of the emission from the communication module 701) according to an embodiment of the disclosure. Thus, placing a dielectric on a side surface (or inside) of the housing may prevent distortion of a signal emitted from the communication module.

Figure 7C:
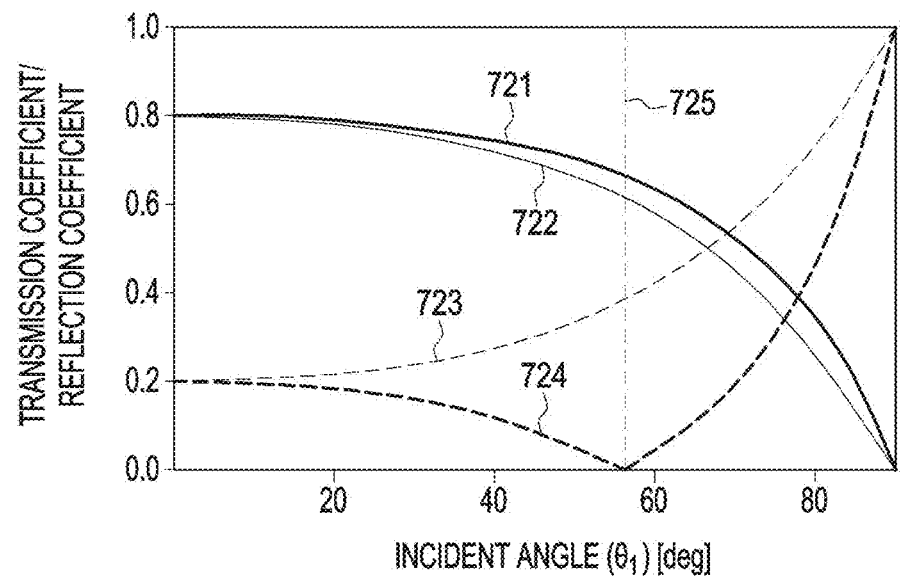

FIG. 7C is a graph indicating the relationship between the incident angle $\theta_1$ at which the incidence wave is incident to the dielectric, the transmission coefficient, and the reflection coefficient according to an embodiment of the disclosure.

For example, the graph of FIG. 7C may be an example graph obtained using an electronic device with both a horizontal antenna and a vertical antenna in the housing according to an embodiment of the disclosure.

In the graph of FIG. 7C, 721 denotes the transmission coefficient ($t_s$) of the horizontal antenna, 722 denotes the transmission coefficient of the vertical antenna, 723 denotes the reflection coefficient ($r_s$) of the horizontal antenna, 724 denotes the reflection coefficient of the vertical antenna, and 725 denotes the angle at which the reflection coefficient is zero, i.e., the Brewster angle.

Referring to FIG. 7C, it can be shown that a higher transmission coefficient (or lower reflection coefficient) may be obtained when the incident angle ($\theta_1$) is about 0° to about 30°. Thus, according to an embodiment of the disclosure, the at least one protrusion of the dielectric may be formed to have the protrusion angle ($\theta_{Rib}$) be an angle of about 60° to about 90° so that the incident angle ($\theta_1$) is about 0° to 30°. In this case, the transmission coefficient may be about 0.8.

What has been described above in connection with the graph of FIG. 7C may be obtained using Equations 4 and 5 according to an embodiment of the disclosure.

$$r_s = \frac{n_1\cos\theta_1 - n_2\cos\theta_2}{n_1\cos\theta_1 + n_2\cos\theta_2} \qquad \text{Equation 4}$$

$$t_s = \frac{2n_1\cos\theta_1}{n_1\cos\theta_1 + n_2\cos\theta_2} \qquad \text{Equation 5}$$

Referring to Equations 4 and 5, the reflection coefficient ($r_s$) and the touchscreen ($t_s$) may be determined by the incident angle ($\theta_1$), the refractive angle ($\theta_2$), the refractive index ($n_1$) of medium 1, and the refractive index ($n_2$) of medium 2. Referring to FIG. 7B, medium 1 may be air, and medium 2 may be the dielectric 710 according to an embodiment of the disclosure.

The range of the incident angle ($\theta_1$) at which the transmission coefficient ($t_s$) is maximized may be about 0° to about 30° using Equations 4 and 5.

Figure 7D:
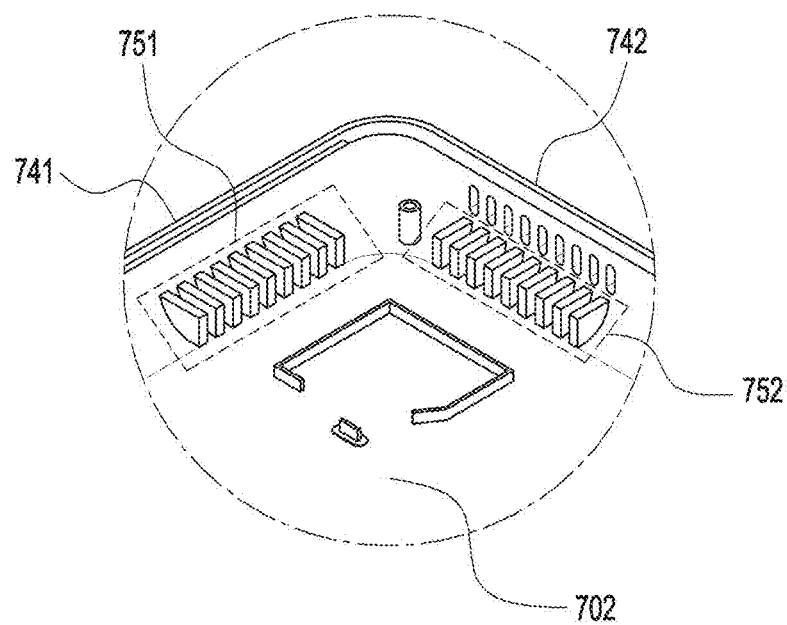

FIG. 7D is a perspective view corresponding to FIGS. 7A and 7B according to various embodiments of the disclosure.

Referring to FIGS. 7B and 7D, the side surface 510 of the housing may include a first side surface portion 741 and a second side surface portion 742 according to various embodiments of the disclosure. For example, the first side surface portion 741 and the second side surface portion 742 may be formed to be perpendicular to each other.

Referring to FIGS. 7B and 7D, the dielectric 710 may include at least one first protrusion 751 shaped as a barrier wall and at least one second protrusion 752 shaped as a barrier wall. For example, the at least one first protrusion 751 and the at least one second protrusion 752 may include five to 15 protrusions, but the number is not limited thereto according to various embodiments of the disclosure. The number, shape, and interval of the at least one first protrusion 751 and the at least one second protrusion 752 may be the same or different. The dielectric members of the at least one first protrusion 751 and the dielectric members of the at least one second protrusion 752 may be arranged in directions perpendicular to each other. The at least one first protrusion 751 and the at least one second protrusion 752 may be positioned in each or at least one of the corners of the housing.

As an example, the dielectric 710 may be integrally formed with the side surface 510 of the housing. For example, the dielectric 710 and the side surface 510 of the housing may be joined together by physical and/or chemical bonding. As another example, the dielectric 710 and the side surface 510 of the housing may be separate members assembled together.

Figure 8A:
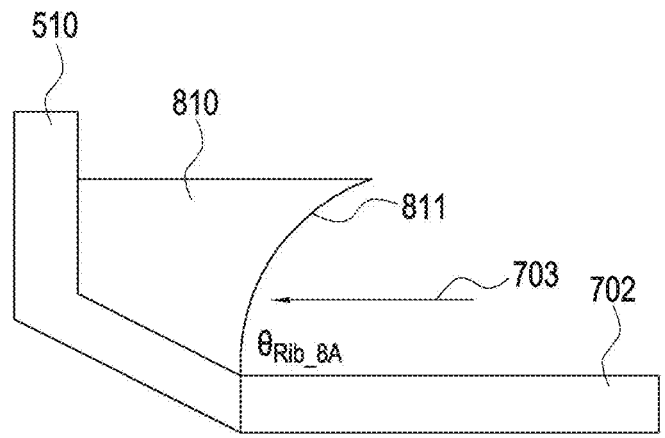
FIGS. 8A, 8B, and 8C are views illustrating a dielectric positioned on a side surface of a housing according to various embodiments of the disclosure.
Figure 8B:
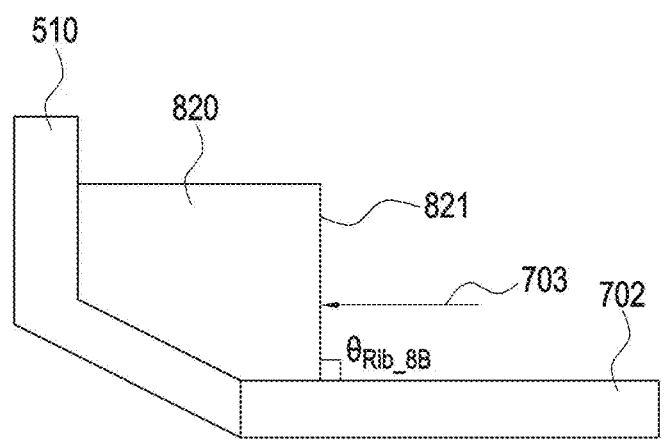
Figure 8C:
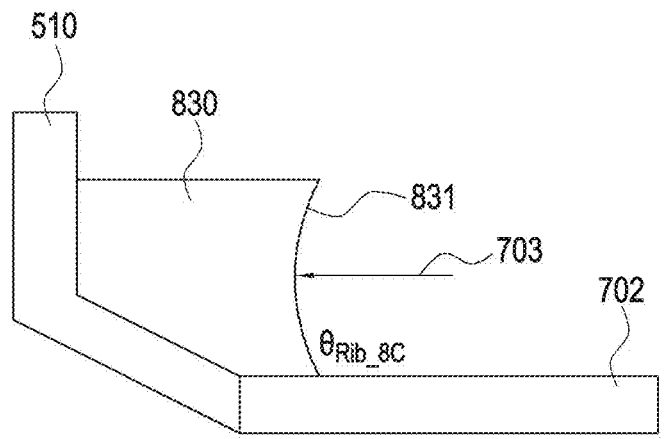

FIGS. 8A, 8B, and 8C are views illustrating a dielectric positioned on a side surface of a housing according to various embodiments of the disclosure.

Dielectrics 810, 820, and 830 shown in FIGS. 8A, 8B, and 8C may be examples of the dielectric 710 described above in connection with FIG. 7 according to various embodiments of the disclosure. The dielectrics 810, 820, and 830 of FIGS. 8A, 8B, and 8C may be any one of at least one protrusion according to various embodiments of the disclosure.

FIG. 8A is a cross-sectional view of a dielectric according to an embodiment of the disclosure.

Referring to FIG. 8A, the cross section of a side surface 811 of the dielectric 810, unlike the dielectric 710 of FIG. 7, may be a curved surface with any curvature according to an embodiment of the disclosure. For example, the cross section of the dielectric 810 may be shaped to have three straight edges and one curved edge as shown in FIG. 8A according to an embodiment of the disclosure. The angle ($\theta_{Rib\_8A}$, protrusion angle) between the side surface 811 of the dielectric 810 and the bottom part 702 of the housing may be an acute angle (0° to 90°).

FIG. 8B is a cross-sectional view of the dielectric 820 according to an embodiment of the disclosure.

Referring to FIG. 8B, the dielectric 820 may be shaped in such a manner that the side surface 510 of the housing connects to the bottom part 702 of the housing.

As an example, the dielectric 820 may be shaped so that a side surface 821 of the dielectric 820 is perpendicular to the bottom part 702 of the housing. The angle ($\theta_{Rib\_8B}$, protrusion angle) between the side surface 821 of the dielectric 820 and the bottom part 702 of the housing may be 90°). For example, the cross section of the dielectric 820 may be shaped as a quadrangle so as to have three straight edges and one curved edge as shown in FIG. 8B according to an embodiment of the disclosure.

FIG. 8C is a cross-sectional view of a dielectric according to an embodiment of the disclosure.

Referring to FIG. 8C, the cross section of a side surface 831 of the dielectric 830 may be a curved surface with any curvature. The angle ($\theta_{Rib\_8C}$, protrusion angle) between the side surface 831 of the dielectric 830 and the bottom part 702 of the housing may be an acute angle (0° to 90°). For example, the cross section of the dielectric 830 may be shaped to have three straight edges and one curved edge as shown in FIG. 8C according to an embodiment of the disclosure.

The side surface 831 of the dielectric may be concave into the dielectric 830 as shown in FIG. 8C or, as another example, be convex out of the dielectric 830 according to an embodiment of the disclosure.

Figure 9:
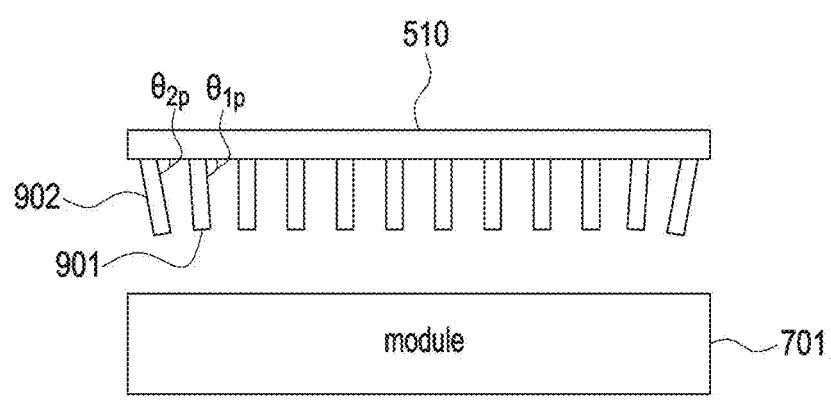
FIG. 9 is a plan view illustrating a dielectric according to an embodiment of the disclosure.

FIG. 9 is a plan view illustrating a dielectric according to an embodiment of the disclosure.

FIG. 9 illustrates an example of application of the dielectric 710 of FIG. 7A according to various embodiments of the disclosure.

While at least one protrusion of the dielectric 710 of FIG. 7A is formed to be perpendicular (90°) to the side surface 510 of the housing, at least one protrusion (e.g., protrusion 901 and protrusion 902) of the dielectric of FIG. 9 is angled at a predetermined angle $\theta_{1P}$ and $\theta_{2P}$ from the side surface 510 of the housing according to an embodiment of the disclosure. The predetermined angle $\theta_{1P}$ and $\theta_{2P}$ may be an acute angle (0° to 90°).

Predetermined angle $\theta_{1P}$ and predetermined angle $\theta_{2P}$ respectively denote the angle between the protrusion 901 and the side surface 510 of the housing and the angle between the protrusion 902 and the side surface 510 of the housing. Although the predetermined angle $\theta_{1P}$ between the protrusion 901 and the side surface 510 of the housing and the predetermined angle $\theta_{2P}$ between the protrusion 902 and the side surface 510 of the housing may differ from each other as shown in FIG. 9, they may alternatively be equal to each other. Although FIG. 9 illustrates an example in which only part of the at least one dielectric is not perpendicular to the side surface 510 of the housing, none of the at least one dielectric positioned on the side surface 510 of the housing may be formed to be perpendicular to the side surface 510 of the housing according to an embodiment of the disclosure.

Figure 10:
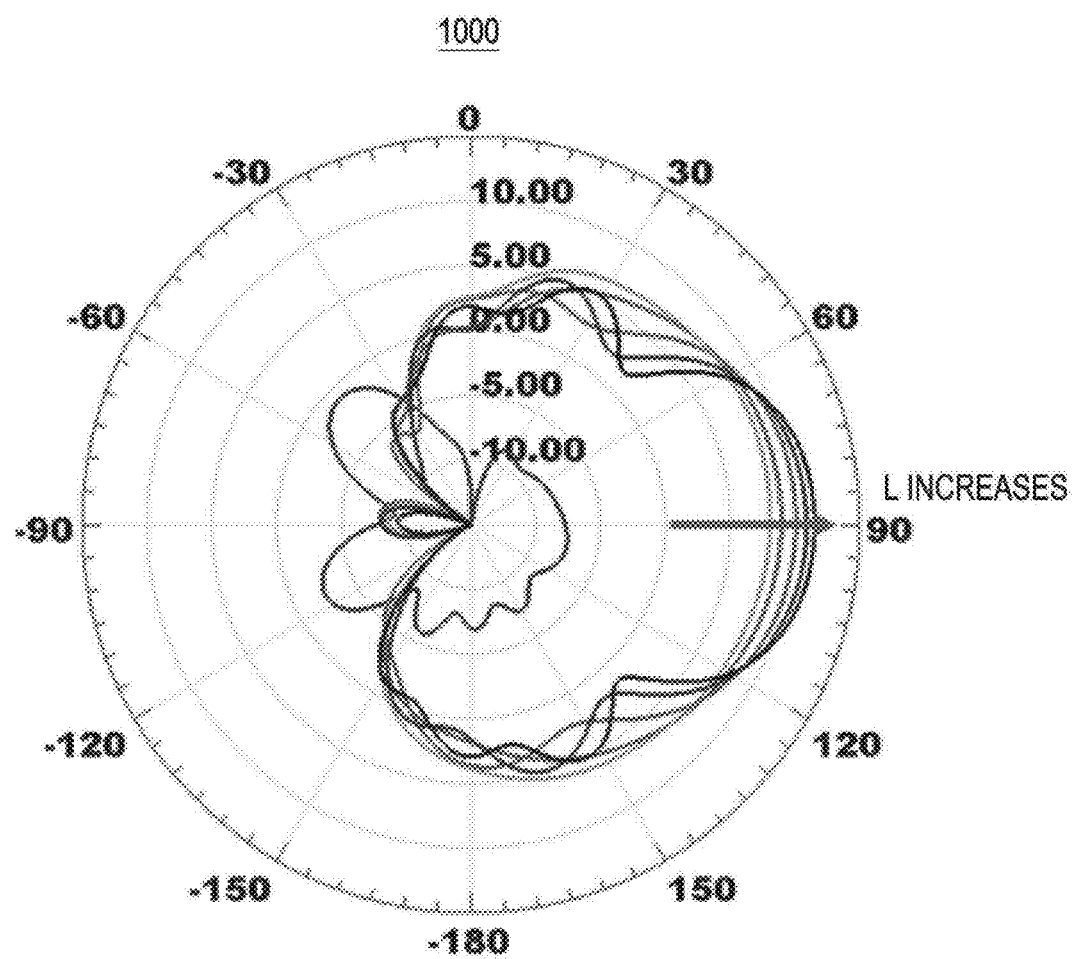
FIG. 10 is a view illustrating variations in characteristics as a length of a dielectric varies according to an embodiment of the disclosure.

FIG. 10 is a view illustrating variations in characteristics as a length of a dielectric varies according to an embodiment of the disclosure.

Referring to FIG. 10, diagram 1000 is an antenna directivity diagram showing variations in antenna gain due to variances in a length L of a dielectric (protrusion) positioned inside or on the side surface of the housing according to an embodiment of the disclosure.

Referring to the diagram 1000 of FIG. 10, as the length L of the dielectric (protrusion) increases, the antenna gain exhibits the tendency of increasing according to an embodiment of the disclosure. The diagram 1000 merely shows the results of an experiment, but it should be noted that it is subject to changes by a different experiment.

Figure 11A:
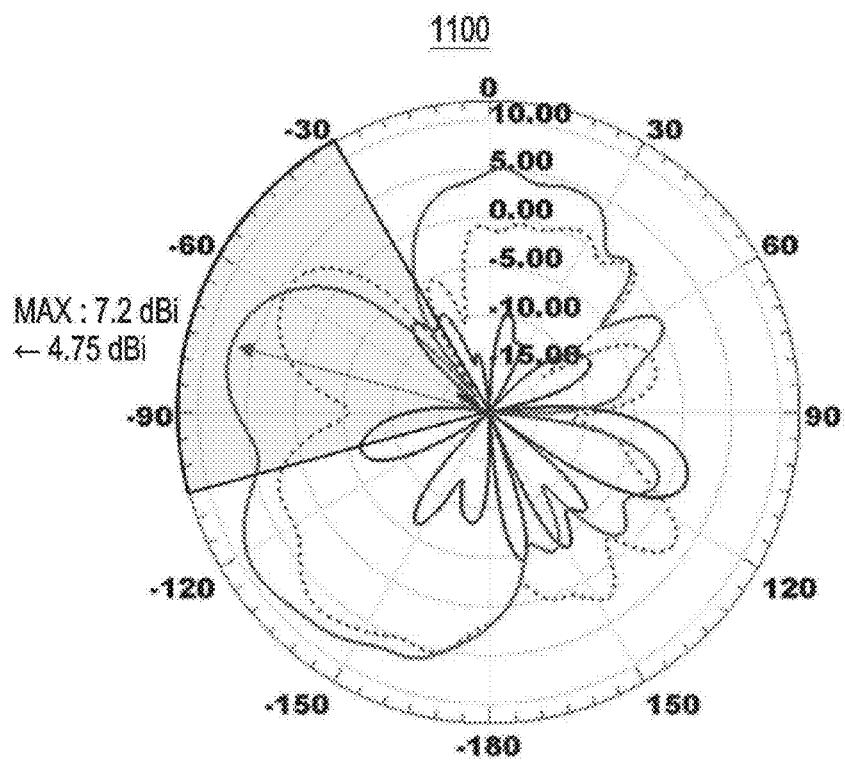
FIGS. 11A and 11B are views illustrating characteristics according to various embodiments of the disclosure.
Figure 11B:
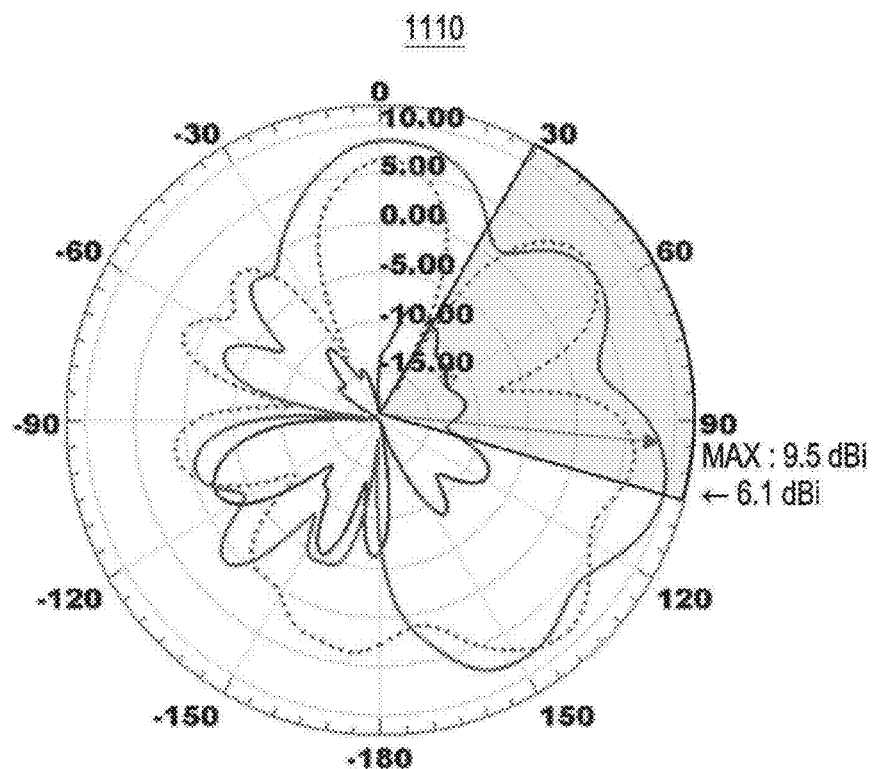

FIGS. 11A and 11B are views illustrating characteristics according to various embodiments of the disclosures.

Referring to FIGS. 11A and 11B, diagram 1100 of FIG. 11A and diagram 1110 of FIG. 11B may be antenna directivity diagrams showing the characteristics of an antenna radiating in the horizontal direction according to various embodiments of the disclosure. For example, the antenna may be an end-fire antenna.

In the diagram 1100 of FIG. 11A, the dotted lines indicate an example diagram obtained when a housing with no dielectric is used, and the solid lines indicate an example diagram obtained when a dielectric-containing housing is used according to an embodiment of the disclosure.

In the diagram 1100 of FIG. 11A, when a dielectric-free housing is used, the antenna gain is 4.75 dBi, and when a dielectric-containing housing is used as indicated by the solid lines, the antenna gain is 7.2 dBi according to an embodiment of the disclosure.

In the diagram 1110 of FIG. 11B, the dotted lines indicate another example diagram obtained when a housing with no dielectric is used, and the solid lines indicate another example diagram obtained when a dielectric-containing housing is used according to an embodiment of the disclosure.

In the diagram 1110 of FIG. 11B, when a dielectric-free housing is used, the antenna gain is 6.1 dBi, and when a dielectric-containing housing is used as indicated by the solid lines, the antenna gain is 9.5 dBi according to an embodiment of the disclosure.

The diagrams 1100 and 1110 of FIGS. 11A and 11B merely show the results of an experiment, and it should be noted that the results may be varied by, e.g., experimental environments according to various embodiments of the disclosure.

Thus, it can be shown that the use of a dielectric, according to an embodiment, may enhance antenna gain in the horizontal direction.

Figure 12A:
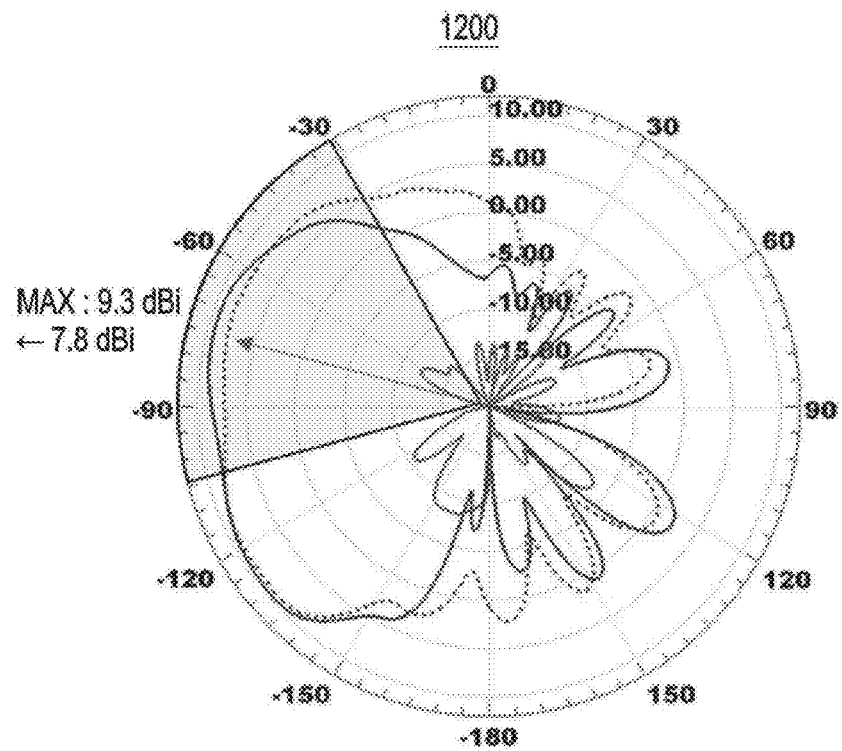
FIGS. 12A and 12B are views illustrating characteristics according to various embodiments of the disclosure.
Figure 12B:
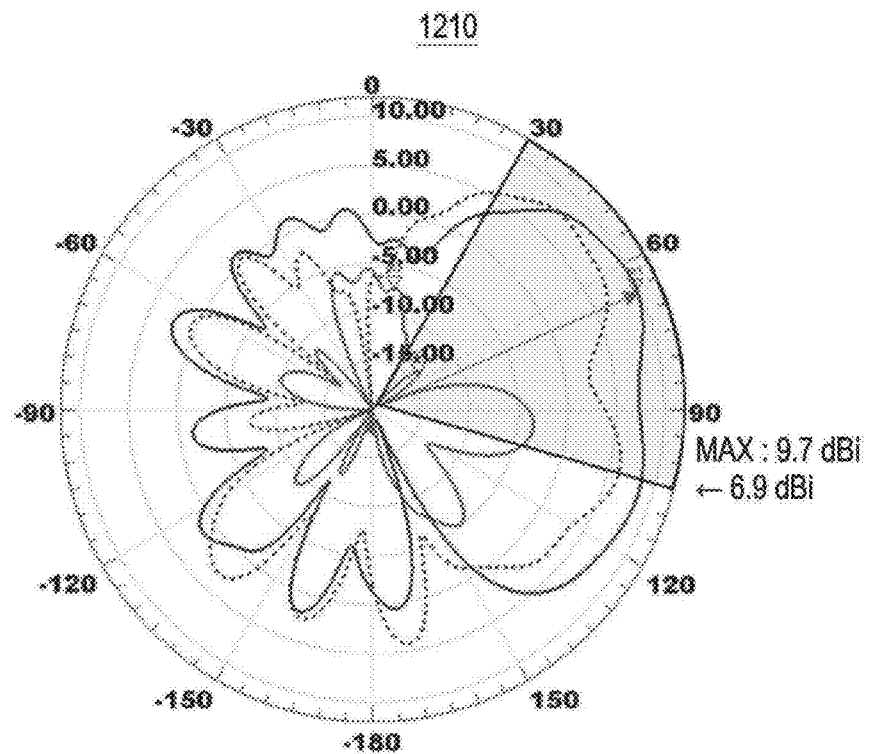

FIGS. 12A and 12B are views illustrating characteristics according to various embodiments of the disclosure.

Referring to FIGS. 12A and 12B, diagram 1200 of FIG. 12A and diagram 1210 of FIG. 12B may be antenna directivity diagrams showing the characteristics of an antenna radiating in the vertical direction according to various embodiments of the disclosure. For example, the antenna may be a broadside antenna.

In the diagram 1200 of FIG. 12A, the dotted lines indicate an example diagram obtained when a housing with no dielectric is used, and the solid lines indicate an example diagram obtained when a dielectric-containing housing is used according to an embodiment of the disclosure.

In the diagram 1200 of FIG. 12A, when a dielectric-free housing is used, the antenna gain is 7.8 dBi, and when a dielectric-containing housing is used as indicated by the solid lines, the antenna gain is 9.3 dBi according to an embodiment of the disclosure.

In the diagram 1210 of FIG. 12B, the dotted lines indicate another example diagram obtained when a housing with no dielectric is used, and the solid lines indicate another example diagram obtained when a dielectric-containing housing is used according to an embodiment of the disclosure.

In the diagram 1210 of FIG. 12A, when a dielectric-free housing is used, the antenna gain is 6.9 dBi, and when a dielectric-containing housing is used as indicated by the solid lines, the antenna gain is 9.7 dBi according to an embodiment of the disclosure.

As set forth above, the diagram 1200 of FIG. 12A and the diagram 1210 of FIG. 12B show that the use of a dielectric, according to an embodiment, may enhance antenna gain in the vertical direction according to an embodiment of the disclosure. In other words, when a dielectric, according to an embodiment, is used, the antenna gain in the horizontal direction is enhanced, but such an issue that the antenna gain in the vertical direction decreases (i.e., deterioration of vertical polarization (V-pol) antenna performance) does not occur.

The diagrams 1200 and 1210 of FIGS. 12A and 12B merely show the results of an experiment, and it should be noted that the results may be varied by, e.g., experimental environments according to various embodiments of the disclosure.

Figure 13A:
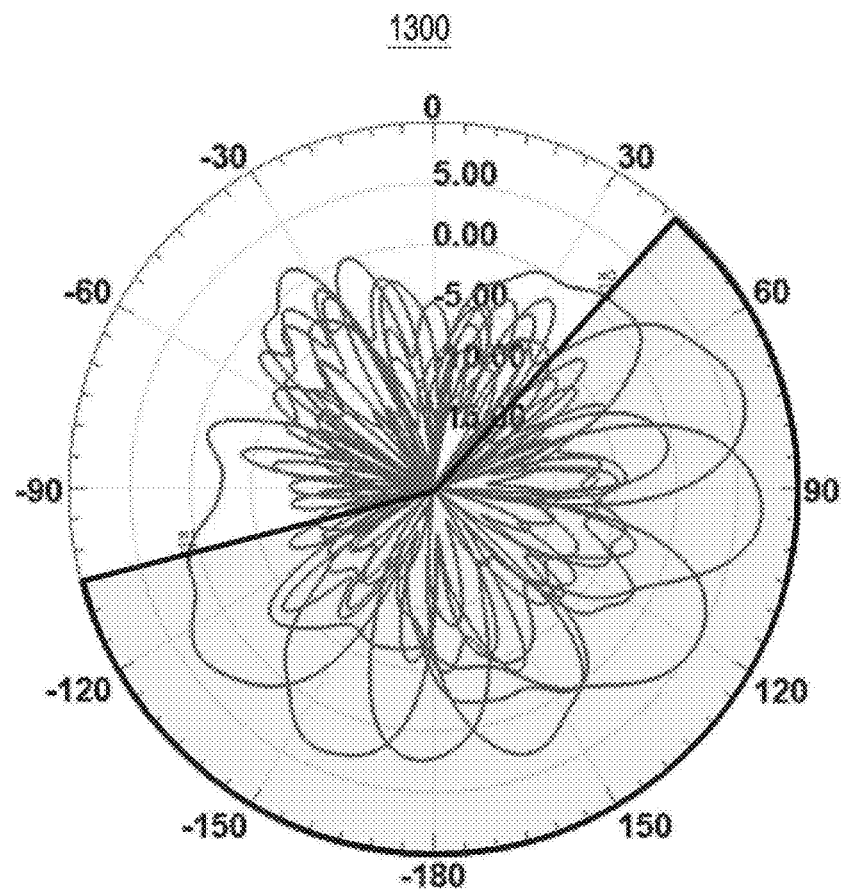
FIGS. 13A and 13B are views illustrating characteristics according to various embodiments of the disclosure.
Figure 13B:
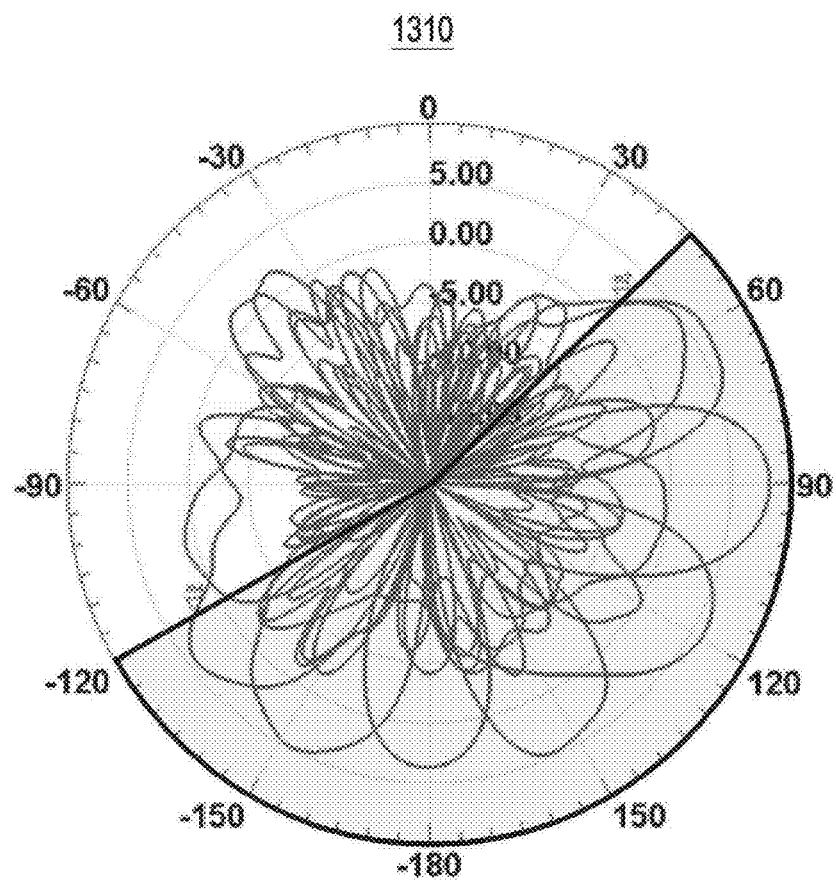

FIGS. 13A and 13B are views illustrating characteristics according to various embodiments of the disclosure.

Referring to FIGS. 13A and 13B, diagram 1300 of FIG. 13A and diagram 1310 of FIG. 13B may be antenna directivity diagrams showing the characteristics of an antenna radiating in the horizontal direction according to an embodiment of the disclosure. For example, the antenna may be an end-fire antenna.

The diagram 1300 of FIG. 13A indicates an example diagram obtained when a housing with no dielectric is used, and the diagram 1310 of FIG. 13B indicates an example diagram obtained when a dielectric-containing housing is used according to an embodiment of the disclosure.

Referring to the diagram 1300 and table 1301 of FIG. 13A, the maximum antenna gain is 7 dBi, and the phase coverage ranges from (–)74° to (–)137° according to an embodiment of the disclosure. For example, the phase coverage may indicate a region of the maximum antenna gain –6 dB (i.e., 6 dB less than the maximum antenna gain).

Referring to the diagram 1310 and table 1311 of FIG. 13B, the maximum antenna gain is 8.8 dBi, and the phase coverage ranges from (–)61° to (–)137° according to an embodiment of the disclosure.

It can be shown from FIGS. 13A and 13B that the use of a dielectric-containing housing, according to an embodiment, may increase both the antenna gain and phase coverage (as shown in FIG. 13B) as compared to when a dielectric-free housing is used (as shown in FIG. 13A) according to various embodiments of the disclosure. Thus, a dielectric, according to an embodiment, may be effective in light of both the antenna gain and phase coverage.

Figure 14A:
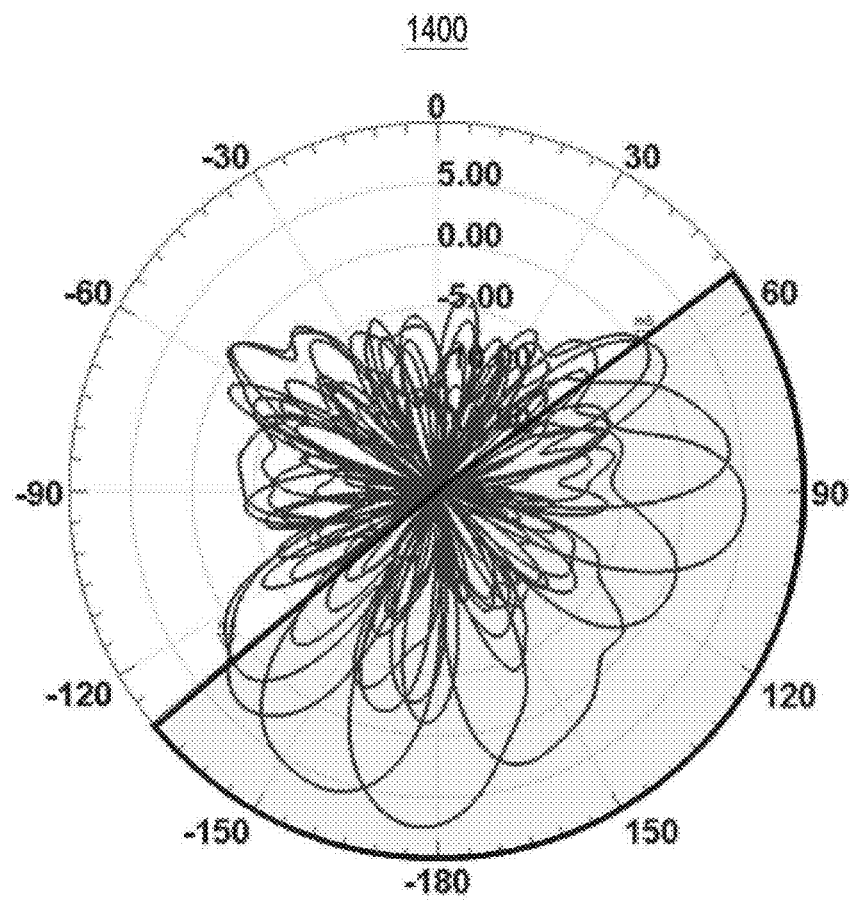
FIGS. 14A and 14B are views illustrating characteristics according to various embodiments of the disclosure.
Figure 14B:
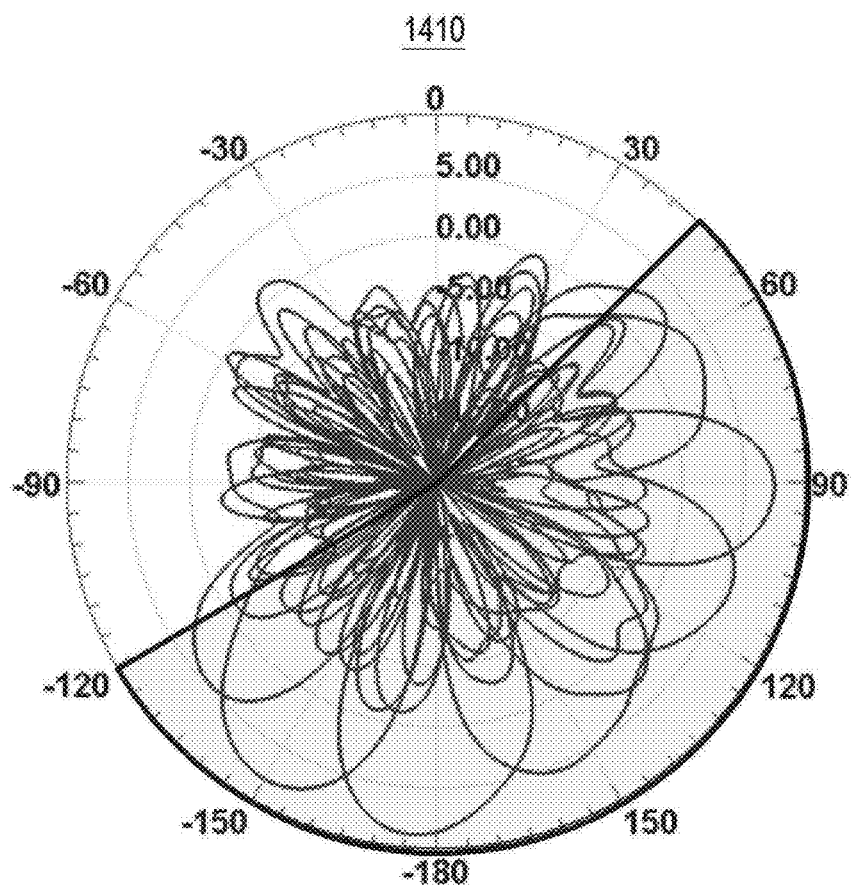

FIGS. 14A and 14B are views illustrating characteristics according to various embodiments of the disclosure.

Referring to FIGS. 14A and 14B, diagram 1400 of FIG. 14A and diagram 1410 of FIG. 14B may be antenna directivity diagrams showing the characteristics of an antenna radiating in the vertical direction according to various embodiments of the disclosure. For example, the antenna may be a broadside antenna.

The diagram 1400 of FIG. 14A indicates another example diagram obtained when a housing with no dielectric is used, and the diagram 1410 of FIG. 14B indicates another example diagram obtained when a dielectric-containing housing is used according to various embodiments of the disclosure.

Referring to the diagram 1400 and table 1401 of FIG. 14A, the maximum antenna gain is 7.4 dBi, and the phase coverage ranges from (–)53° to (–)125° according to an embodiment of the disclosure. For example, the phase coverage may indicate a region of the maximum antenna gain –6 dB (i.e., 6 dB less than the maximum antenna gain).

Referring to the diagram 1410 and table 1411 of FIG. 14A, the maximum antenna gain is 8.8 dBi, and the phase coverage ranges from (–)66° to (–)136° according to an embodiment of the disclosure.

It can be shown from FIGS. 14A and 14B that the use of a dielectric-containing housing, according to various embodiments of the disclosure, may increase both the antenna gain and phase coverage (as shown in FIG. 14B) as compared to when a dielectric-free housing is used (as shown in FIG. 14A). Thus, a dielectric, according to various embodiments of the disclosure, may be effective in light of both the antenna gain and phase coverage.

Figure 15A:
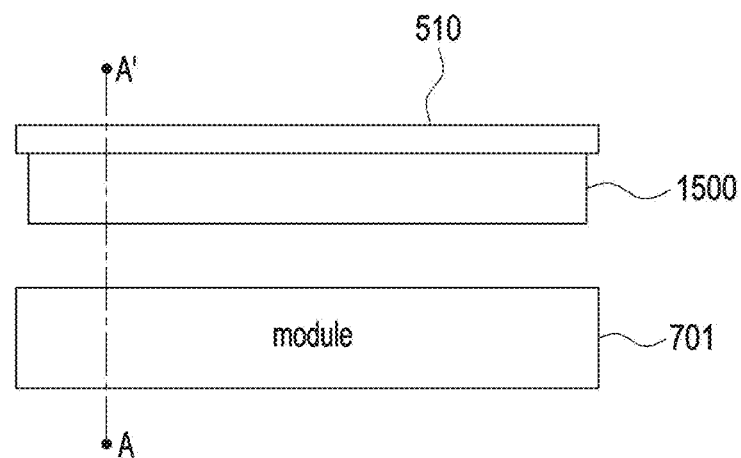
FIGS. 15A, 15B, and 15C are views illustrating a dielectric according to various embodiments of the disclosure.
Figure 15B:
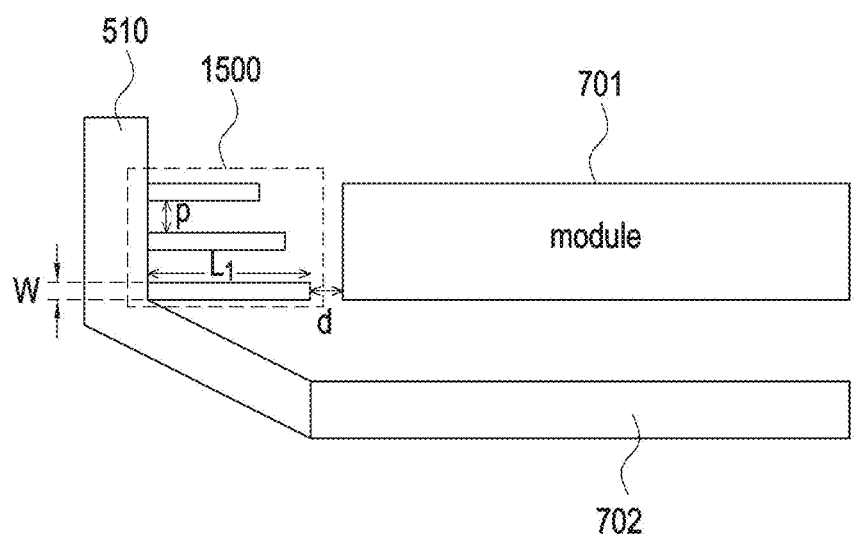
Figure 15C:
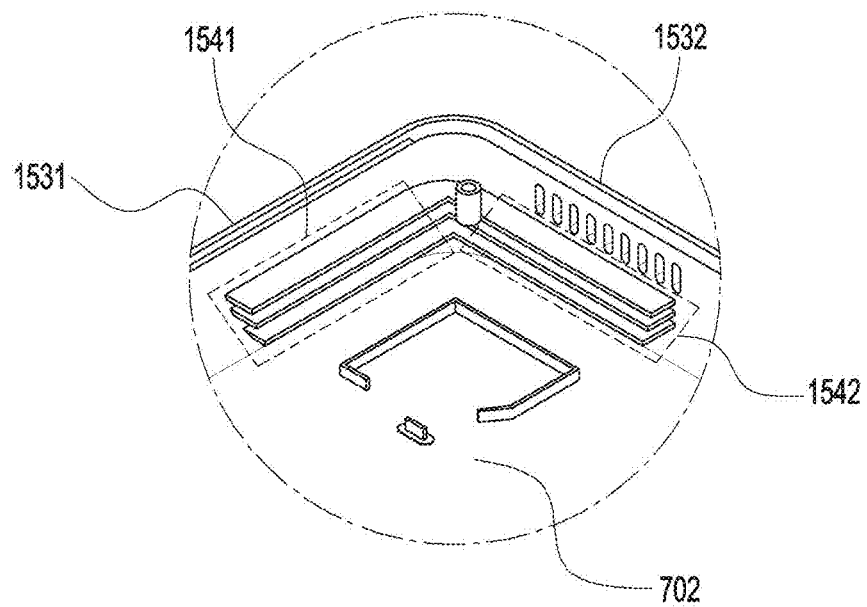

FIGS. 15A, 15B, and 15C are views illustrating a dielectric according to various embodiments of the disclosure.

FIG. 15A is a plan view illustrating a configuration including a side surface of a housing, a dielectric, and a communication module according to an embodiment of the disclosure.

Referring to FIG. 15A, a dielectric 1500 may be a flat panel-shaped member attached to the side surface 510 of the housing according to an embodiment of the disclosure. For example, the dielectric 1500 and the side surface 510 of the housing may be joined together by physical and/or chemical bonding.

FIG. 15B is a cross-sectional view obtained by cutting the components of FIG. 15A along dash-dotted line A-A' of FIG. 15A according to various embodiments of the disclosure.

Referring to FIG. 15B, the dielectric 1500 may include at least one protrusion that is $L_1$ long and shaped as a flat panel. The at least one protrusion may be formed stepwise. The at least one protrusion of the dielectric 1500, as shown in FIG. 15B, may be vertically attached to the side surface 510 (specifically, the first region 520) of the housing or formed to be positioned parallel with the bottom part 702 of the housing according to an embodiment of the disclosure. The side surface 510 of the housing may be a member corresponding to a side cover or edge of the housing, and the bottom part 702 may be a member corresponding to the bottom, bottom surface, or rear cover of the housing.

Referring to FIG. 15B, $L_1$, W, P, and d respectively denote the length of the dielectric 1500, the thickness of the dielectric 1500, the inter-dielectric interval, and the distance between the dielectric 1500 and the communication module 701 according to an embodiment of the disclosure. The dielectric 1500 may indicate any one of the at least one protrusion.

The length $L_1$ of the dielectric 1500 may be proportional to the wavelength of the signal emitted from the communication module 701. The signal emitted from the communication module 701 may correspond to mm Wave. For example, the signal emitted from the communication module 701 may be a signal of about 28 GHz used for 5G communications, with the result having about 10.7 mm wavelength. The length ($L_1$) of the dielectric may be the value obtained by dividing the wavelength of the incidence wave 703 emitted from the communication module 701 by a multiple of 2 (namely, $L_1=\lambda(2m)$ (m=1, 2, 3 ... )).

As an example, as shown in FIG. 15B, a plurality of dielectrics with different lengths may be positioned on or attached to the side surface 510 (specifically, the first region 520) of the housing. The plurality of dielectrics may be formed to be parallel with each other according to an embodiment of the disclosure.

The inter-dielectric interval P may be proportional to the wavelength of the signal emitted from the communication module 701. For example, the inter-dielectric interval P may be the value obtained by dividing the wavelength of the signal emitted from the communication module 701 by a multiple of 2. For example, the inter-dielectric interval $P=\lambda(2m)$ (m=1, 2, 3 ... ).

The distance d between the dielectric 1500 and the communication module 701 may be smaller than the value proportional to the wavelength of the signal emitted from the communication module 701. For example, the distance d between the dielectric 1500 and the communication module 701 may meet the following equation: $d<\lambda/4$ (namely, it may be smaller than the value obtained by dividing the wavelength by 4). The distance d between the dielectric 1500 and the communication module 701 may be determined by the longest one of the at least one dielectric.

FIG. 15C is a perspective view corresponding to FIGS. 15A and 15B according to various embodiments of the disclosure.

Referring to FIGS. 15B and 15C, the side surface 510 of the housing may include a first side surface portion 1531 and a second side surface portion 1532 according to various embodiments of the disclosure. For example, the first side surface portion 1531 and the second side surface portion 1532 may be formed to be perpendicular to each other.

Referring to FIGS. 15B and 15C, the dielectric 1500 may include at least one stepwise first protrusion 1541 and at least one stepwise second protrusion 1542 according to various embodiment of the disclosure. For example, the at least one stepwise first protrusion 1541 and the at least one stepwise second protrusion 1542 may include two to five protrusions, but the number is not limited thereto. The number, shape, and interval of the at least one stepwise first protrusion 1541 and the at least one stepwise second protrusion 1542 may be the same or different. The at least one stepwise first protrusion 1541 and the at least one stepwise second protrusion 1542 may be formed to be perpendicular to each other as viewed at plan view. The at least one stepwise first protrusion 1541 and the at least one stepwise second protrusion 1542 may be positioned in each or at least one of the corners of the housing.

As an example, the dielectric 1500 may be integrally formed with the side surface 510 of the housing. For example, the dielectric 1500 and the side surface 510 of the housing may be joined together by physical and/or chemical bonding. As another example, the dielectric 710 and the side surface 510 of the housing may be separate members assembled together.

Figure 16:
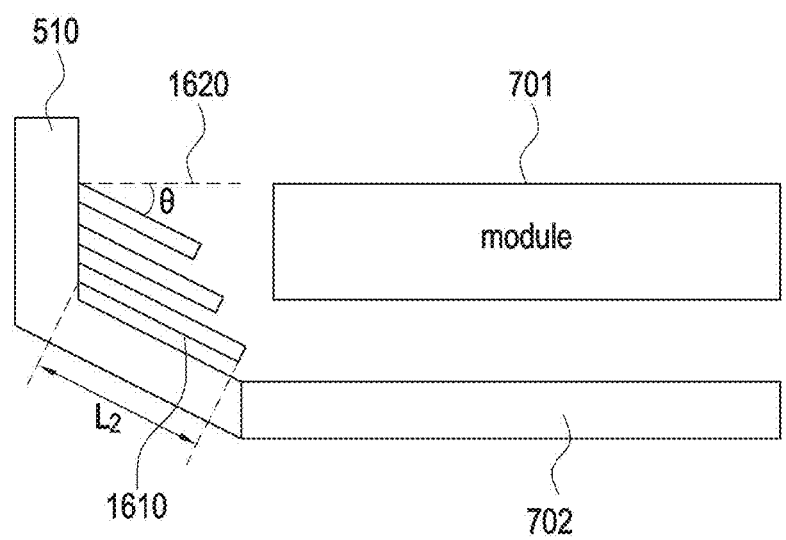
FIG. 16 is a cross-sectional view illustrating a dielectric according to an embodiment of the disclosure.

FIG. 16 is a cross-sectional view illustrating a dielectric according to an embodiment of the disclosure.

A dielectric 1610 of FIG. 16 is an example of application of the dielectric 1500 of FIG. 15A according to an embodiment of the disclosure.

Unlike the dielectric 1500 positioned to be perpendicular to the side surface 510 of the housing, the dielectric 1610 may be formed to be angled at a predetermined angle θ from a virtual line 1620 perpendicular to the side surface 510 of the housing.

Referring to FIG. 16, θ denotes the angle between the dielectric 1610 and the virtual line 1620 perpendicular to the side surface 510 of the housing, and $L_2$ denotes the length of the dielectric 1610 according to an embodiment of the disclosure.

As an example, a plurality of dielectrics with different lengths may be attached to the side surface 510 (specifically, the first region 520) of the housing. The plurality of dielectrics may be formed to be positioned parallel with each other and, as another example, the plurality of dielectrics may be formed at different angles θ.

Figure 17A:
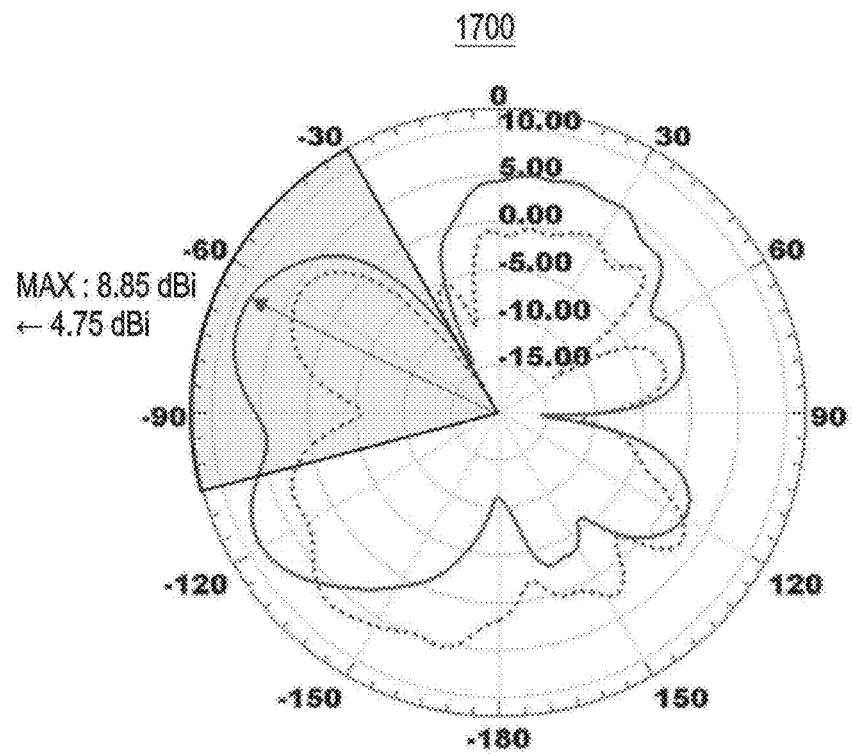
FIGS. 17A and 17B are views illustrating characteristics according to various embodiments of the disclosure.
Figure 17B:
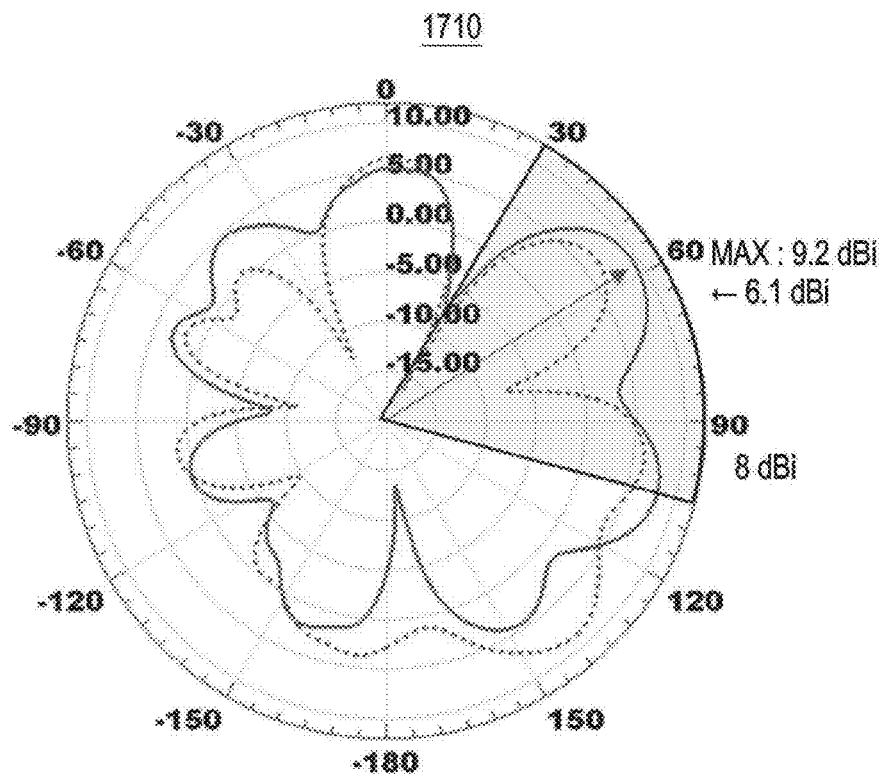

FIGS. 17A and 17B are views illustrating characteristics according to various embodiments of the disclosure.

Referring to FIGS. 17A and 17B, diagram 1700 of FIG. 17A and diagram 1710 of FIG. 17B may be antenna directivity diagrams showing the characteristics of an antenna radiating in the horizontal direction according to various embodiments of the disclosure. For example, the antenna may be an end-fire antenna.

In the diagram 1700 of FIG. 17A, the dotted lines indicate an example diagram obtained when a housing with no dielectric is used, and the solid lines indicate an example diagram obtained when a dielectric-containing housing is used according to an embodiment of the disclosure.

In the diagram 1700 of FIG. 17A, when a dielectric-free housing is used, the antenna gain is 4.75 dBi, and when a dielectric-containing housing is used as indicated by the solid lines, the antenna gain is 8.85 dBi according to an embodiment of the disclosure.

In the diagram 1710 of FIG. 17B, the dotted lines indicate another example diagram obtained when a housing with no dielectric is used, and the solid lines indicate another example diagram obtained when a dielectric-containing housing is used according to an embodiment of the disclosure.

In the diagram 1710 of FIG. 17B, when a dielectric-free housing is used, the antenna gain is 6.1 dBi, and when a dielectric-containing housing is used as indicated by the solid lines, the antenna gain is 9.2 dBi according to an embodiment of the disclosure.

The diagrams 1700 and 1710 of FIGS. 17A and 17B merely show the results of an experiment, and it should be noted that the results may be varied by, e.g., experimental environments according to various embodiments of the disclosure.

Thus, it can be shown that the use of a dielectric, according to an embodiment, may enhance antenna gain.

Figure 18A:
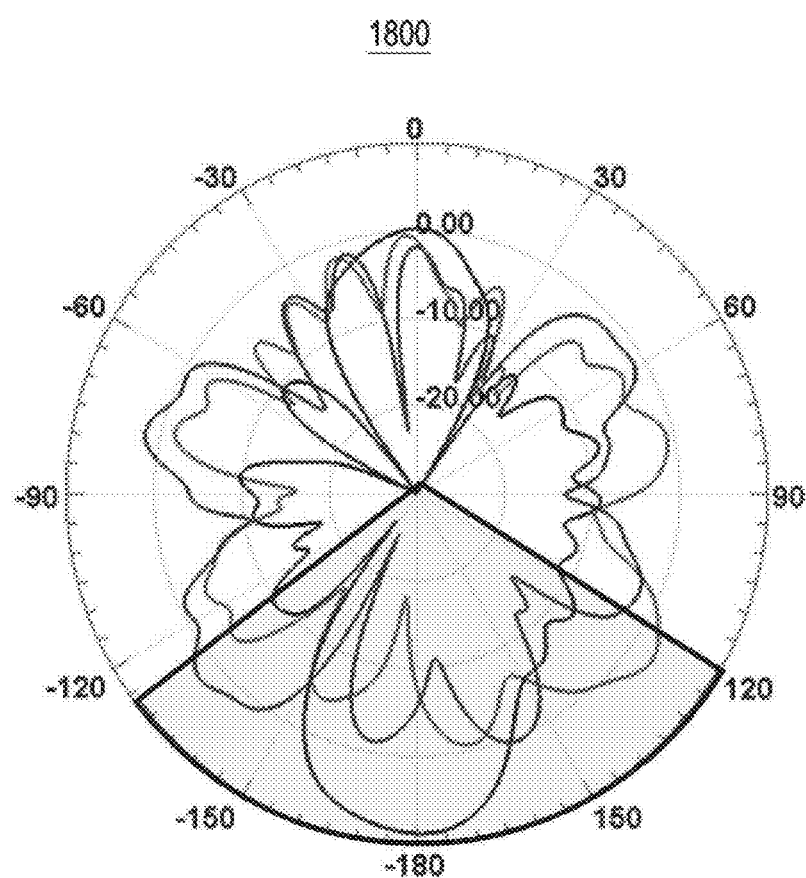
FIGS. 18A and 18B are views illustrating characteristics according to various embodiments of the disclosure.
Figure 18B:
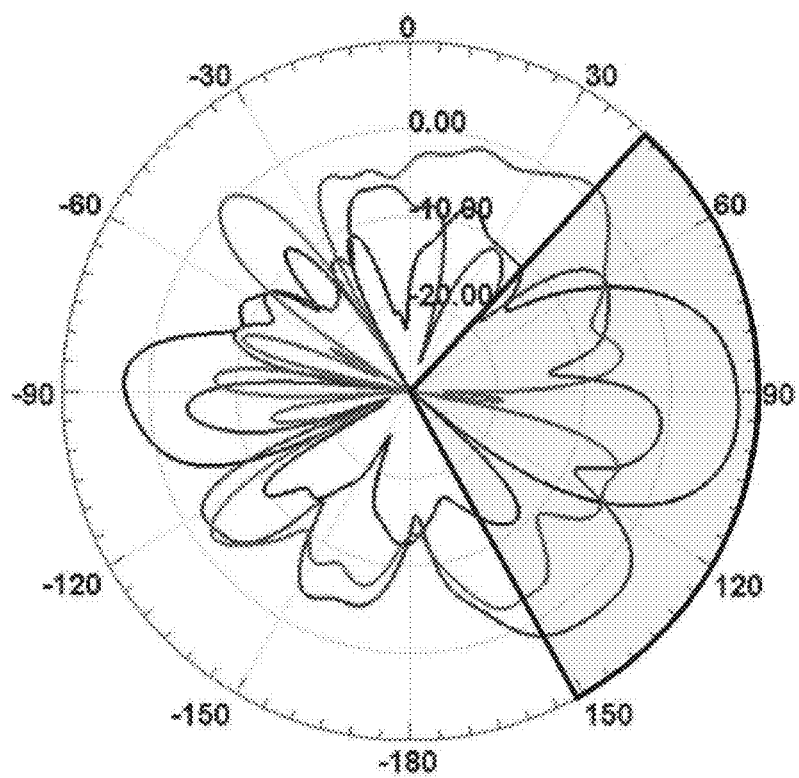

FIGS. 18A and 18B are views illustrating characteristics according to various embodiments of the disclosure.

Referring to FIGS. 18A and 18B, diagram 1800 of FIG. 18A and diagram 1810 of FIG. 18B may be antenna directivity diagrams showing the characteristics of an antenna radiating in the horizontal direction according to various embodiments of the disclosure. For example, the antenna may be an end-fire antenna.

The diagram 1800 of FIG. 18A indicates an example diagram obtained when a housing with no dielectric is used, and the diagram 1810 of FIG. 18B indicates an example diagram obtained when a dielectric-containing housing is used according to various embodiments of the disclosure.

Referring to the diagram 1800 and table 1801 of FIG. 18A, the maximum antenna gain is 8.8 dBi, and the phase coverage ranges from (−)52° to (−)59° according to an embodiment of the disclosure. For example, the phase coverage may indicate a region of the maximum antenna gain −6 dB (i.e., 6 dB less than the maximum antenna gain).

Referring to the diagram 1810 and table 1811 of FIG. 18B, the maximum antenna gain is 9.2 dBi, and the phase coverage ranges from (−)46° to (−)61° according to an embodiment of the disclosure.

It can be shown from FIGS. 18A and 18B that the use of a dielectric-containing housing, according to various embodiments of the disclosure, may increase both the antenna gain and phase coverage (as shown in FIG. 18B) as compared to when a dielectric-free housing is used (as shown in FIG. 18A). Thus, a dielectric, according to an embodiment, may be effective in light of both the antenna gain and phase coverage.

Figure 19:
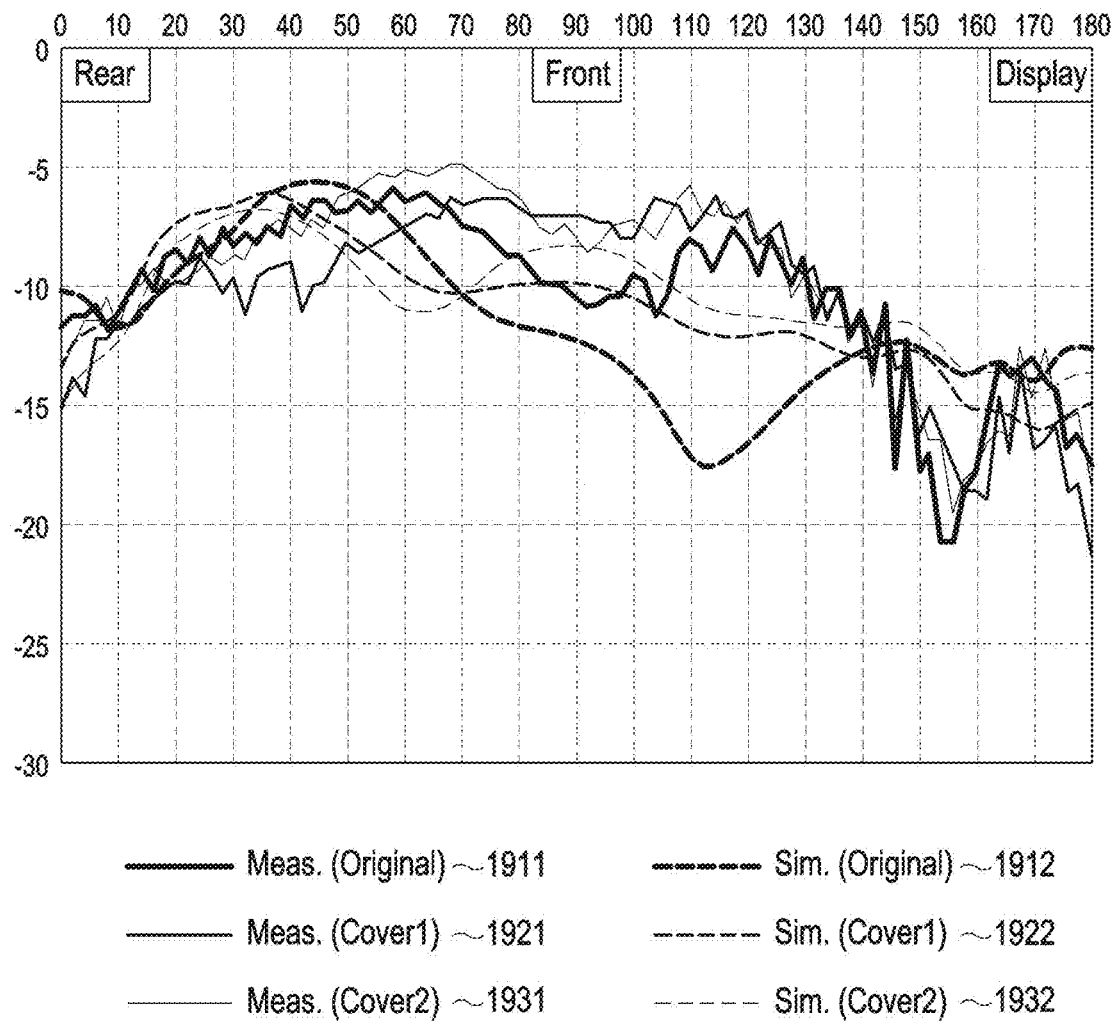
FIG. 19 is a graph illustrating variations in an antenna gain according to an embodiment of the disclosure.

FIG. 19 is a graph illustrating variations in antenna gain according to an embodiment of the disclosure.

Referring to FIG. 19, solid lines 1911, 1921, and 1931 indicate the results of antenna gain actually measured, and dashed lines 1912, 1922, and 1932 indicate example simulation results according to an embodiment of the disclosure. The graph of FIG. 19 merely shows the results of an experiment, and it should be noted that the results may be varied by, e.g., experimental environments.

The solid line 1911 and the dashed line 1912 may indicate data obtained using a housing with no dielectric according to an embodiment. The solid line 1921 and the dashed line 1922 may indicate data obtained using a housing including a dielectric (e.g., 710) formed to be perpendicular to the bottom part. The solid line 1931 and the dashed line 1932 may indicate data obtained using a housing with a dielectric (e.g., the dielectric 1500) formed to be parallel with the bottom part.

Comparing the solid lines 1911, 1921, and 1931, it can be shown that the antenna gain corresponding to the front of the housing is higher in the solid lines 1921 and 1931 than in the solid line 1911. In other words, it can be shown from the results of the experiment that the use of a housing with a dielectric, according to an embodiment, may provide a higher antenna gain than when a housing with no dielectric is used. "Rear" in FIG. 19 may correspond to the rear surface of the housing, "Front" in FIG. 19 may correspond to the front surface of the housing, and "Display" may correspond to the display inside the housing.

Comparing the dashed lines 1912, 1922, and 1932, it can be shown that the antenna gain corresponding to the front of the housing is higher in the dashed lines 1922 and 1932 than in the dashed line 1912. In other words, it can be shown from the results of the simulation that the use of a housing with a dielectric, according to an embodiment, may provide a higher antenna gain than when a housing with no dielectric is used.

As is apparent from the foregoing description, according to various embodiments, a housing and electronic device including a dielectric may enhance antenna performance.

According to various embodiments, a housing and electronic device including a dielectric may enhance antenna gain.

According to various embodiments, a housing and electronic device including a dielectric may enhance the phase coverage of an antenna.

It is apparent to one of ordinary skill in the art that the electronic device and the antenna structure of the electronic device according to various embodiments of the disclosure as described above are not limited to the above-described embodiments and those shown in the drawings, and various changes, modifications, or alterations may be made thereto without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A terminal device using an antenna, the terminal device comprising:
   a housing; and
   at least one protrusion including a dielectric,
   wherein the at least one protrusion is configured to be positioned between a side surface of the housing and the antenna,
   wherein the at least one protrusion and the antenna are separated from each other,
   wherein at least one side surface of each of the at least one protrusion facing the antenna is formed to have a first angle within a first range with respect to a bottom part of the housing, and
   wherein, based on the first angle within the first range, a signal transmitted from the antenna is incident to the at least one side surface at a second angle within a second range.

2. The terminal device of claim 1,
   wherein the first range is from 60° to 90°, and
   wherein the second range is from 0° to 30°.

3. The terminal device of claim 1, wherein the at least one protrusion is formed to be parallel to a bottom part of the housing.

4. The terminal device of claim 1, wherein the at least one protrusion is positioned inside at least one corner of the housing.

5. The terminal device of claim 4,
   wherein the dielectric includes at least one first protrusion and at least one second protrusion, and wherein a direction in which the at least one first protrusion is arranged is perpendicular to a direction in which the at least one second protrusion is arranged.

6. The terminal device of claim 1, wherein the dielectric includes a plurality of protrusions.

7. The terminal device of claim 1, wherein the at least one protrusion is configured to enhance at least one of an antenna gain or a phase coverage of an incidence wave emitted from the antenna in a direction of the side surface of the housing.

8. The A terminal device using an antenna, the terminal device comprising:
   a housing; and
   at least one protrusion including a dielectric,
   wherein the at least one protrusion is configured to be positioned between a side surface of the housing and the antenna,
   wherein the at least one protrusion and the antenna are separated from each other, and
   wherein at least one of a length of the at least one protrusion, an interval between the at least one protrusion, or a distance between the at least one protrusion and the antenna is related to a wavelength of a signal emitted from the antenna.

9. The terminal device of claim 8, wherein the length of the at least one protrusion or the interval between the at least one protrusion is determined by dividing the wavelength of the signal emitted from the antenna by a multiple of 2.

10. The terminal device of claim 8, wherein the distance between the at least one protrusion and the antenna is smaller than a value determined by dividing the wavelength of the signal emitted from the antenna by 4.

11. The terminal device of claim 8, wherein the dielectric includes a plurality of protrusions.

12. The terminal device of claim 8, wherein the at least one protrusion is configured to enhance at least one of an antenna gain or a phase coverage of an incidence wave emitted from the antenna in a direction of the side surface of the housing.

13. The A terminal device using an antenna, the terminal device comprising:
    a housing; and
    at least one protrusion including a dielectric,
    wherein the at least one protrusion is configured to be positioned between a side surface of the housing and the antenna,
    wherein the at least one protrusion and the antenna are separated from each other,
    wherein the at least one protrusion is formed to be perpendicular to a bottom part of the housing, and
    wherein each of the at least one protrusion is spaced apart from each other at a same interval and positioned on the side surface of the housing.

14. The terminal device of claim 13, wherein the dielectric includes a plurality of protrusions.

15. The terminal device of claim 13, wherein the at least one protrusion is configured to enhance at least one of an antenna gain or a phase coverage of an incidence wave emitted from the antenna in a direction of the side surface of the housing.

* * * * *